(12) United States Patent
Ogino

(10) Patent No.: US 6,201,610 B1
(45) Date of Patent: *Mar. 13, 2001

(54) IMAGE FORMING APPARATUS HAVING A MODE IN WHICH AN ORDER OF A PLURALITY OF READ IMAGES TO BE PRINTED CAN BE CHANGED

(75) Inventor: Noboru Ogino, Kawasaki (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/861,107

(22) Filed: May 21, 1997

(30) Foreign Application Priority Data

May 21, 1996 (JP) .................................................. 8-125808

(51) Int. Cl.⁷ .............................. G06F 15/00; G03G 15/00
(52) U.S. Cl. ............................ 358/1.15; 358/1.13; 399/85
(58) Field of Search ..................................... 358/444, 404, 358/468, 401, 452, 426, 296, 1.15, 1.14, 1.16, 1.13, 1.01, 1.18; 399/81, 85, 87

(56) References Cited

U.S. PATENT DOCUMENTS

| 4,557,589 | * | 12/1985 | Fukushi | 355/14 |
|---|---|---|---|---|
| 4,699,503 | * | 10/1987 | Hyltoft | 355/14 |
| 4,941,023 | * | 7/1990 | Holmes et al. | 271/296 |
| 5,104,118 | * | 4/1992 | Hamanaka | 271/297 |
| 5,175,632 | * | 12/1992 | Mayashi et al. | 358/401 |
| 5,177,546 | * | 1/1993 | Tsubo | 355/314 |
| 5,241,397 | | 8/1993 | Yamada | 358/296 |
| 5,301,262 | * | 4/1994 | Kashiwagi | 395/117 |
| 5,384,785 | * | 1/1995 | Yoda | 371/30 |
| 5,457,454 | * | 10/1995 | Maeda | 358/401 |
| 5,627,650 | * | 5/1997 | Nosaki et al. | 358/296 |
| 5,731,879 | * | 3/1998 | Maniwa et al. | 358/296 |
| 5,740,496 | * | 4/1998 | Kawabuchi et al. | 358/437 |
| 5,771,103 | * | 6/1998 | Ogino | 358/437 |
| 5,774,758 | * | 6/1998 | Takahashi et al. | 399/1 |
| 5,801,837 | * | 9/1998 | Hamanaka et al. | 358/296 |
| 5,848,325 | * | 12/1998 | Matsumura | 399/83 |
| 5,880,851 | * | 3/1999 | Imada | 358/437 |
| 5,957,450 | * | 9/1999 | Kida et al. | 271/291 |
| 5,990,438 | * | 11/1999 | Yamashita et al. | 209/584 |

FOREIGN PATENT DOCUMENTS 0 478 356 A2   4/1992  (EP) .
8-223336       8/1996  (JP) .

OTHER PUBLICATIONS

Patent Abstracts of Japan, vol. 012, No. 489 (E–696), Dec. 21, 1988 (JP 63 203059 A, Aug. 22, 1988).

* cited by examiner

Primary Examiner—Madeleine Nguyen
(74) Attorney, Agent, or Firm—Foley & Lardner

(57) ABSTRACT

An image forming apparatus comprises function for reading images of a series of original documents in a first order and for outputting a series of image data items, storage function for storing the series of image data items outputted from the read function, instruct function for instructing one of the first order and a second order reverse to the first order, as an output order in which the series of image data items are outputted, first output function for outputting the series of image data items stored in the storage function, in the first order, in accordance with the output order instructed by the instruct function, second output function for converting the series of image data items stored in the storage function into the second order and for outputting the series of image data items converted, and function for forming images corresponding to the series of image data items outputted from the first or second output function.

18 Claims, 26 Drawing Sheets

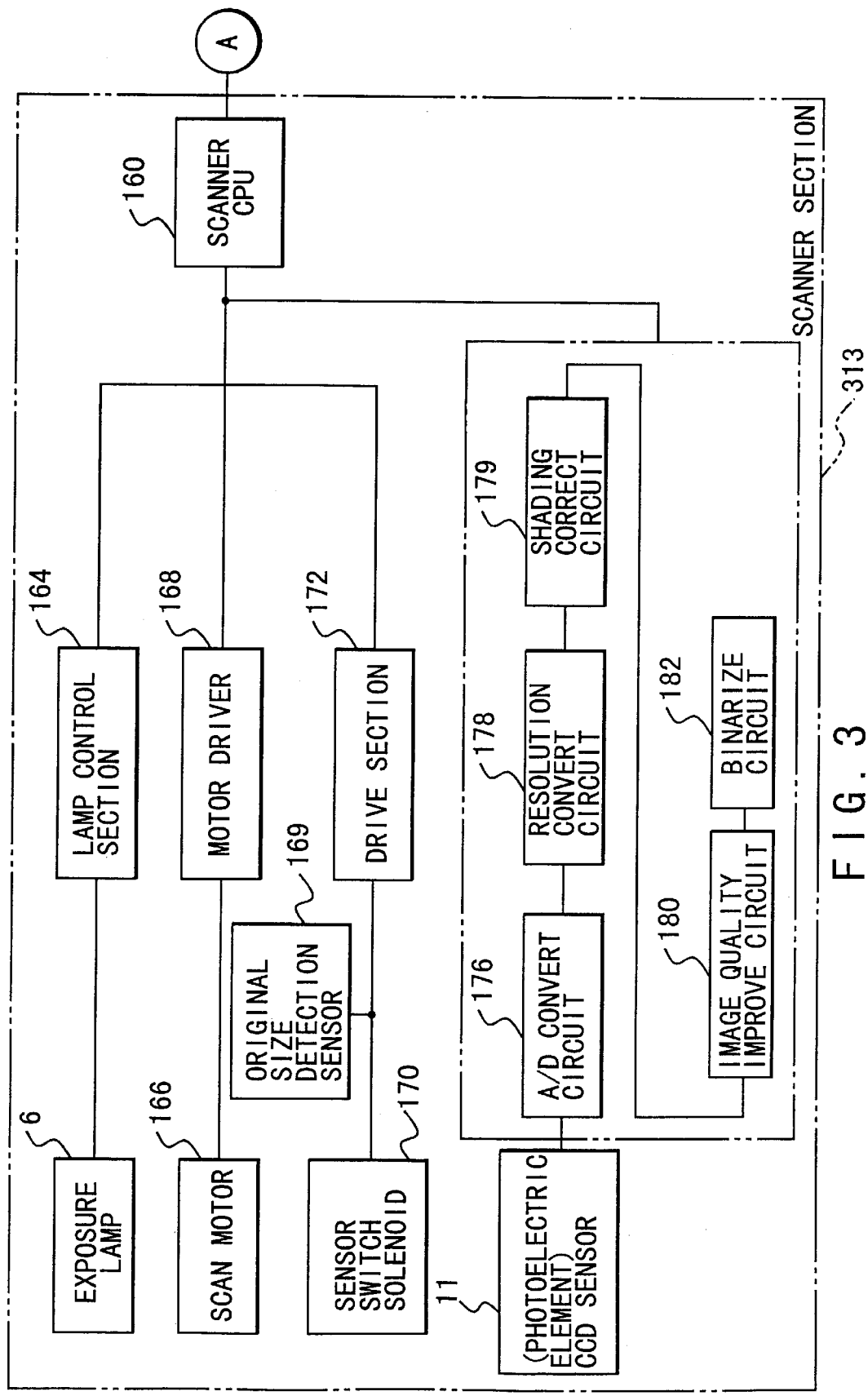
F I G. 3

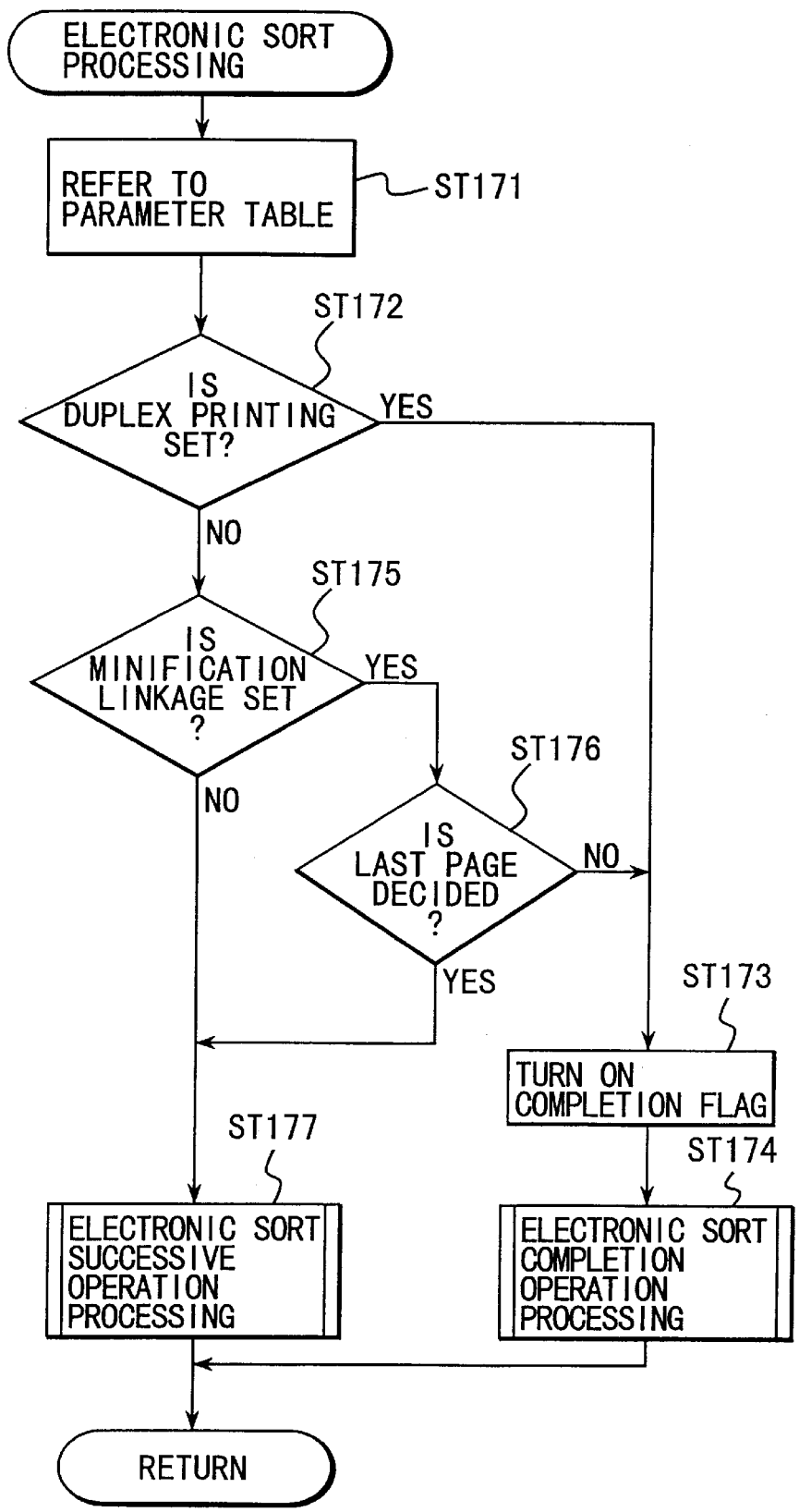
F I G. 20

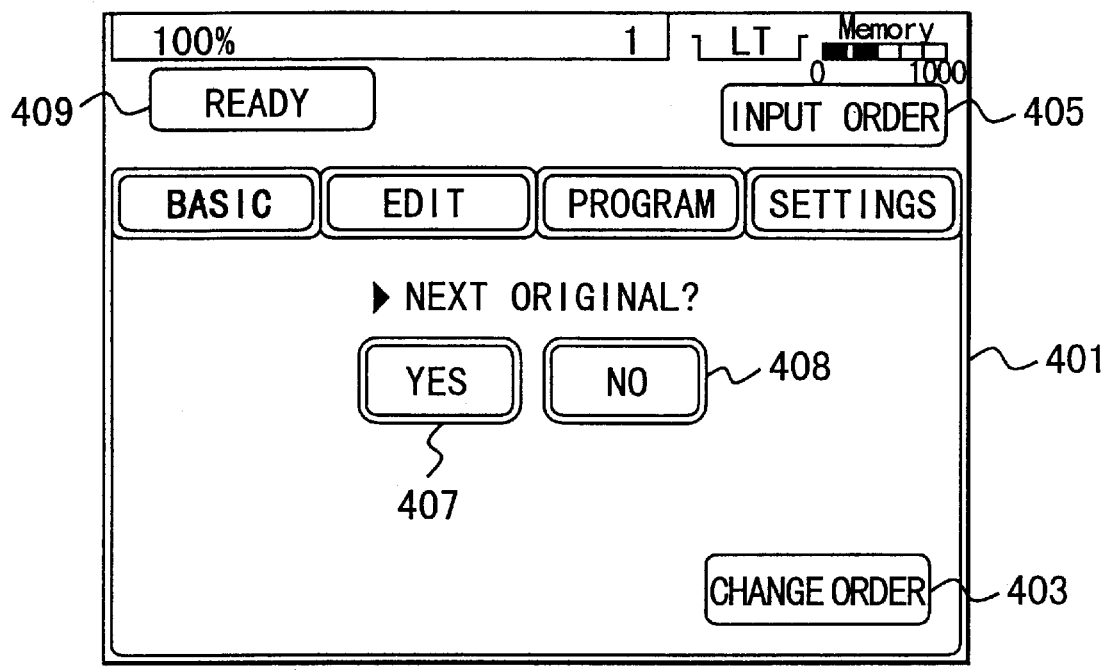
F I G. 2 5
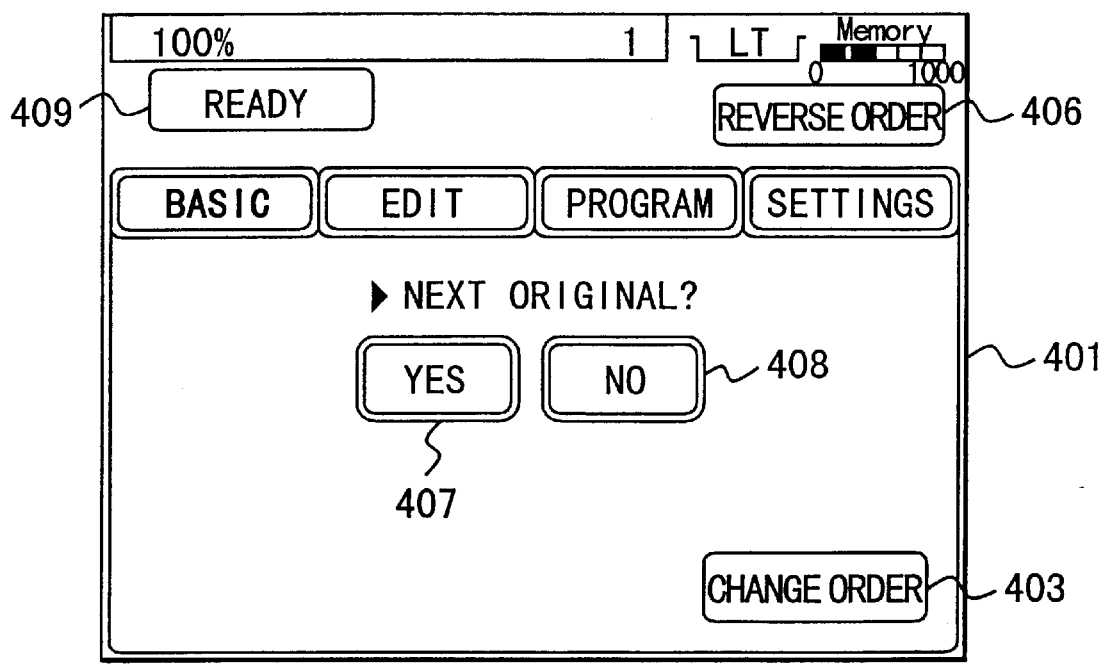
F I G. 2 6

IMAGE FORMING APPARATUS HAVING A MODE IN WHICH AN ORDER OF A PLURALITY OF READ IMAGES TO BE PRINTED CAN BE CHANGED

BACKGROUND OF THE INVENTION

The present invention relates to an image forming apparatus and an image forming method having a function of storing an original image read out through an automatic document feeding device or an original document table, into a page memory, and of change the order of images stored in the page memory.

In an image forming apparatus which converts an image of an original document set on an original document table into electric signals and prints the image on a paper sheet, it is possible to change the order of original documents read and the order of images to be outputted (by means of electronic sorting) if the image forming apparatus has a page memory capable of storing a plurality of images of original documents. A plurality of sets of paper sheets outputted after electronic sort are stapled and fed out, one after another, onto a tray. Also, this image forming apparatus applies an ADF input method in which layered original documents are subjected to one copy instruction with use of an automatic document feeding apparatus (ADF) and a manual setting input method in which original documents are set on a glass surface (of an original document table) and are subjected to copying, one after another, by manually pressing a copy button.

In case of the ADF input method, layered original documents are always fed from the lowest one and fed to the original document table, so that the order of documents to be read is constant. In case of the manual setting input method, original documents can be set either in an order from the top page or from the last page.

In a conventional image forming apparatus, since the manual setting input method adopts the same processing as in the ADF input method, original documents are read in the order from the lowest original document layered, i.e., from the last page. Therefore, if inputting is started manually from the top page, printing is also carried out from the top page so that the top page is fed out to the lowest layer, thus resulting in miscopy. When miscopy occurs, original documents must be inputted again from the first.

As has been explained above, since a conventional image forming apparatus adopts the same processing as the ADF input method, original documents can be read only in the order from the lowest one of the placed original documents, i.e., from the last page. Therefore, if a user once started inputting original documents from the first page, printing is started from the first page and the first page is fed out at the lowest position, thus resulting in a problem of miscopy. In this case, original documents must be inputted again from the first.

BRIEF SUMMARY OF THE INVENTION

The present invention has an object of providing an image forming apparatus and an image forming method capable of specifying a desired printing order during inputting or printing of original documents regardless of the order of the original documents being inputted, thereby preventing miscopy.

According to the present invention, there is provided an image forming apparatus comprises means for reading images of a series of original documents in a first order and for outputting a series of image data items; storage means for storing the series of image data items outputted from the read means; instructing means for instructing one of the first order and a second order reverse to the first order, as an output order in which the series of image data items are outputted; first output means for outputting the series of image data items stored in the storage means, in the first order, in accordance with the output order instructed by the instruct means; second output means for converting the series of image data items stored in the storage means into the second order and for outputting the series of image data items converted; and means for forming images corresponding to the series of image data items outputted from one of the first and second output means.

On the basis of the above structure, the present invention includes a specify means capable of specifying the output order of image data items regardless of the order in which original documents are inputted. As a result, miscopy is not caused even if original documents have been inputted in an order from the last page although the original documents should have been inputted in an order from the top page. Therefore, original documents need not be inputted again, in this case.

In addition, the image forming apparatus according to the present invention further comprises an input means for making an input to change the output order while the read means is reading the images of the original documents, and means for making an input to change the output order while the image forming means is forming the images.

In the above structure according to the present invention, even if an operator finds out that the order of inputted original documents has been wrong while inputting the original documents, the operator can make an instruction for reversing the order of copies to be outputted, at this time point, so that images can be printed in a correct order. Therefore, the original documents need not be read in again from the beginning. As a result of this, burdens to operators can be greatly reduced.

In addition, since it is possible to display a page change screen and to freely switch output order modes while inputting original documents through an ADF device, operators can smoothly proceed the operation without inputting again original documents even when original documents have been inputted in a wrong order.

According to the image forming method of the present invention, the same functions and advantages as described above can be achieved on the same ground as also described above.

Additional objects advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing the structure of a scanner section;

FIG. 20 is a flow-chart for explaining electronic sort processing of face-down feed-out;

FIG. 25 shows an example of a display screen of an operation panel indicating an order change icon in page change processing when inputting an original document, according to the present invention;

FIG. 26 shows an example of a display screen of an operation panel indicating an order change icon in page change processing when inputting an original document, according to the present invention;

DETAILED DESCRIPTION OF THE INVENTION

Figure 1:
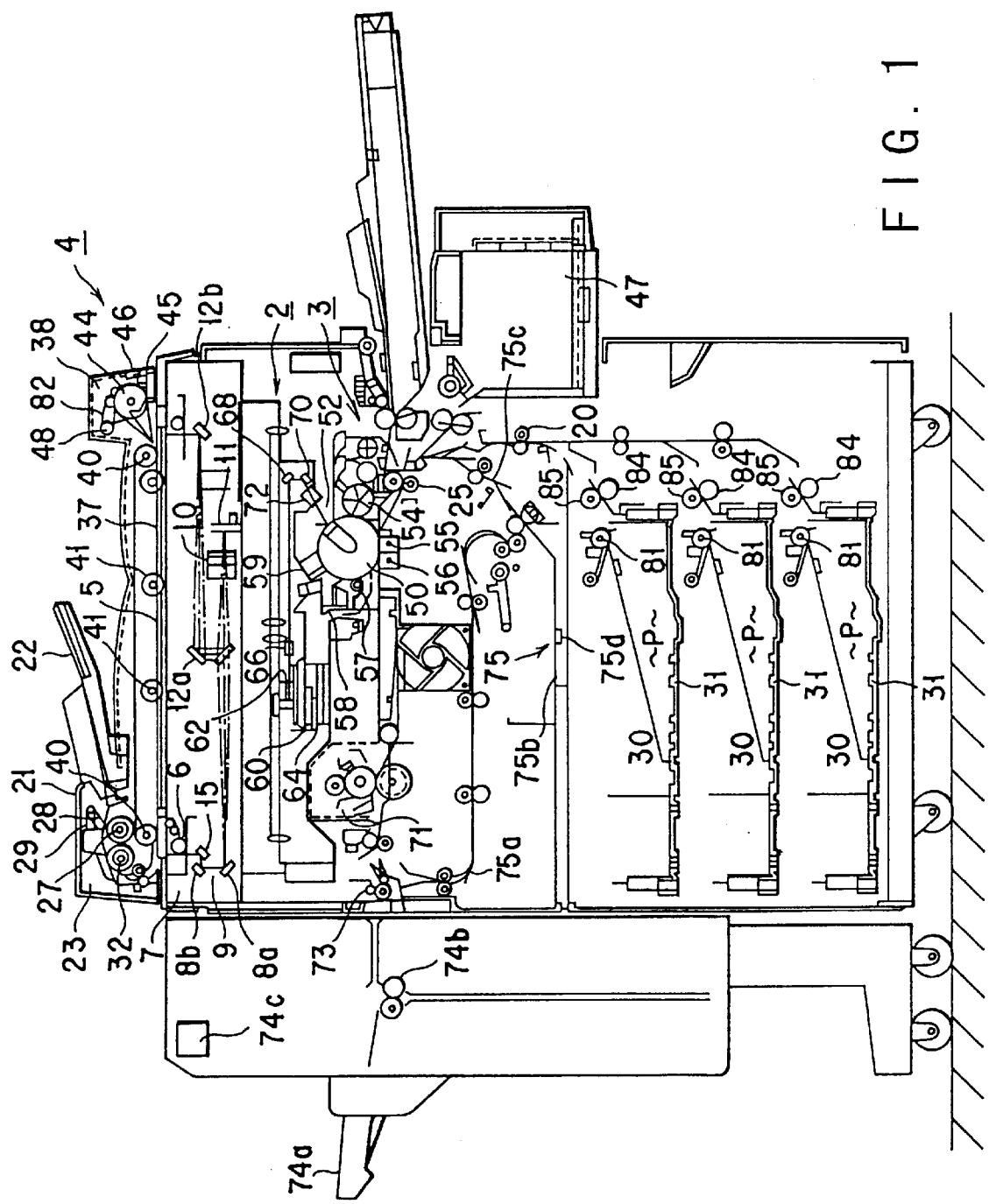
FIG. 1 is a sectional view of a digital copy machine according to an image forming apparatus of the present invention.

In the following, an embodiment of the present invention will be explained with reference to the drawing.

FIG. 1 schematically shows the entire structure of a digital copy machine as an image forming apparatus according to the present invention. This digital copy machine comprises a scanner 2 and a printer 3. An automatic document feed device ADF 4 is installed at an upper portion of the machine.

In the automatic document feed device 4, a rear end edge portion of a cover body 21 is installed on a rear end edge portion of an upper surface of the device body, by a hinge not shown, such that the cover can be freely opened and closed. The entire automatic document feed device 4 can be rotated and moved so that the upper surface of the document table 5 is exposed at need. At a position slightly dislocated in the right-hand direction on the upper surface of the cover 21, an original feeder table 22 is provided which is capable of holding a plurality of original documents together. A feed means 23 is provided at an end side of the device, to pick up and feed original documents, one after another, to an end side of the original document table 5 (in the left-hand side in the figure). The feed means 23 is provided with a pick-up roller 27 for picking up an original document, a weight plate 28 for pressing the document against the roller 27, and an empty sensor 29 as an original document sensor for detecting the setting condition of the original document on the original document feed table 22. Further, a sheet feed roller 32 is provided in the direction in which original documents are picked up, so that original documents can be securely fed one after another. An original document feed belt 37 is provided and tensed above the surface the original document table 5 so as to cover this surface. The original document feed belt 37 is made of a wide endless belt having a white outer surface and bridged between a pair of belt rollers 40, and can be driven in both the regular and reverse directions by a belt drive mechanism (not shown). On the inner circumferential portion or the back side of the original document feed belt 37, there are provided a plurality of belt press rollers 41 for pressing the belt surface against the original document table 5 and a set switch (not shown) for detecting the open or close condition of the automatic original document feed device. Further, an original document fed by the feed means 23 is further fed from an end side (or the left-hand side) to another end side (or the right-hand side). A feed-out means 38 is provided at a right-hand portion of the device, and the feed-out means 38 is provided with a feed roller 44, a pinch roller 45 for pressing an original document against the feed roller 44, and a feed-out sensor 46 as an original document detection means for detecting a rear end of an original fed in the feed-out direction. In addition, a gate 82 for reversing and guiding an original document is provided in the original document feed-out course, so that duplex copy is achieved.

A scanner 2 comprises an exposure lamp 6, a first carriage 7 provided with a mirror 15, a second carriage 9 provided with mirrors 8a and 8b for bending a light course, a lens 10, a CCD sensor 11 for receiving reflected light, a drive system (not shown) for changing positions of these components, and an A/D convert section (not shown) for converting an output of the CCD sensor 11, i.e., analogue image data (information) into digital data. The first and second carriages 7 and 9 are connected with each other by a timing belt (not shown), and the second carriage 9 can be moved in the same direction as the first carriage 7, at an half speed of the moving speed of the first carriage 9. In this manner, scanning can be performed such that the light path length to the lens 10 is maintained to be constant. The lens 10 described above can be moved in the optical axis the lens 10 with the focal distance fixed, when changing the magnification. The CCD sensor 11 is arranged such that one pixel of an original document image corresponds to an element of the CCD sensor. The output of the CCD sensor 11 is supplied to an A/D convert section. Movements of the first and second carriages 7 and 9 and the mirrors 12a and 12b are obtained in accordance with a movement of a timing belt (not shown) bridged between a drive pulley (not shown) connected to the rotation shaft of the stepping motor and an idle pulley (not shown). The lens 10 is moved in the optical axis direction in accordance with a movement of a spiral shaft (not shown) which is rotated by a corresponding stepping motor (not shown).

In correspondence with a laser diode 60, a collimator lens 62, a polygon mirror (or multi-surface reflection mirror) 64, a lens 66, reflection mirrors 68, 70, and a lens 72 are provided so that a laser beam is irradiated onto a photosensitive drum 50 from an exposure device 52.

The printer 3 adopts a combination of a laser optical system and an electronic photography method capable of forming an image on a transfer paper sheet, for example. Specifically, the printer 3 has a photosensitive drum 50 as an image carrier rotatably pivoted at the substantial center in the printer. An exposure device 52, a development device 54, a transfer charger 55, a peel charger 56, a PCC charger 57, a discharge lamp 58, and an electrification charger 59 are provided in this order around the photosensitive drum 50. The photosensitive drum 50 is arranged such that the drum is uniformly charged by the electrification charger 59. A laser beam is outputted from the scanner 2 to form an image on an original document on the photosensitive drum 50, thereby forming a latent image.

Further, the latent image formed on the photosensitive drum 50 is developed by the development device 54, and a developed image is transferred by the transfer charger 55, onto a copy paper sheet P supplied from a feed cassette 30 through a feed roller 20 and an aligning roller 25. After the transfer by the transfer charger 55, the copy paper sheet P is peeled by the peel charger 56 by means of AC corona discharging, and is conveyed to a fixture device 71 by a feed belt. The copy paper sheet P on which the developed image is melted and fixed by the fixture device 71 is fed out to a unit 74 having a feed-out tray 74a, by a pair of feed-out rollers 73. The unit 74 has a pair of rollers 74b for making the copy paper sheet P faced down after fed out by the pair of feed-out rollers 73. The unit 74 further has a stapler 74c, which is provided at an upper portion of the unit 74, for stapling every one set of sheets in a staple sort mode.

Meanwhile, a developing agent remaining on the photosensitive drum 50 after transferring the developed image and peeling the copy paper sheet P is cleared by the PCC charger 57, and the electric potential of the photosensitive drum 50 is set to be a constant level or less by the discharge charger 58, to enable the following copy operation.

In case of duplex copy in which images are printed on both surfaces of a copy paper sheet P, the copy paper sheet P on one surface of which a developed image is melted and fixed by the fixture device 71 described above is conveyed through a feed path 75a and is thereafter compiled on the tray 75b. This paper sheet P, one surface of which has been subjected to printing, is conveyed through a convey path 75c to the transfer charger 55 described above where a developed image is transferred on the other surface. In addition, a paper sheet sensor 75d is provided at a lower portion of the tray 75b, to detect presence or absence of a paper sheet stacked on the tray 75b.

The convey path 75a, the tray 75b, and the paper sheet-sensor 75d together constitute an automatic duplex device (ADD) 75 as an automatic duplex reverse mechanism.

In the figure, reference numeral 30 denotes paper sheet feed cassettes as paper sheet feed means which are vertically arranged in a plurality of stages and can be detached from the front side of the device body 1. This paper sheet feed cassette 30 consists of a cassette case 31 as a casing containing copy paper sheets P, and the case 31 has a pick-up end portion inclined in the direction in which paper sheets are extracted. The copy paper sheets P are picked up and extracted in the order from the uppermost layer by a pick-up roller 81. One after another of copy paper sheets P extracted by the pick-up roller 81 and fed to the pick-up end portion of the cassette case 31 is separated by a sheet separating section consisting of a sheet feed roller 84 and a separation roller (or separation pad) 85 and is fed to the printer 3.

Figure 2:
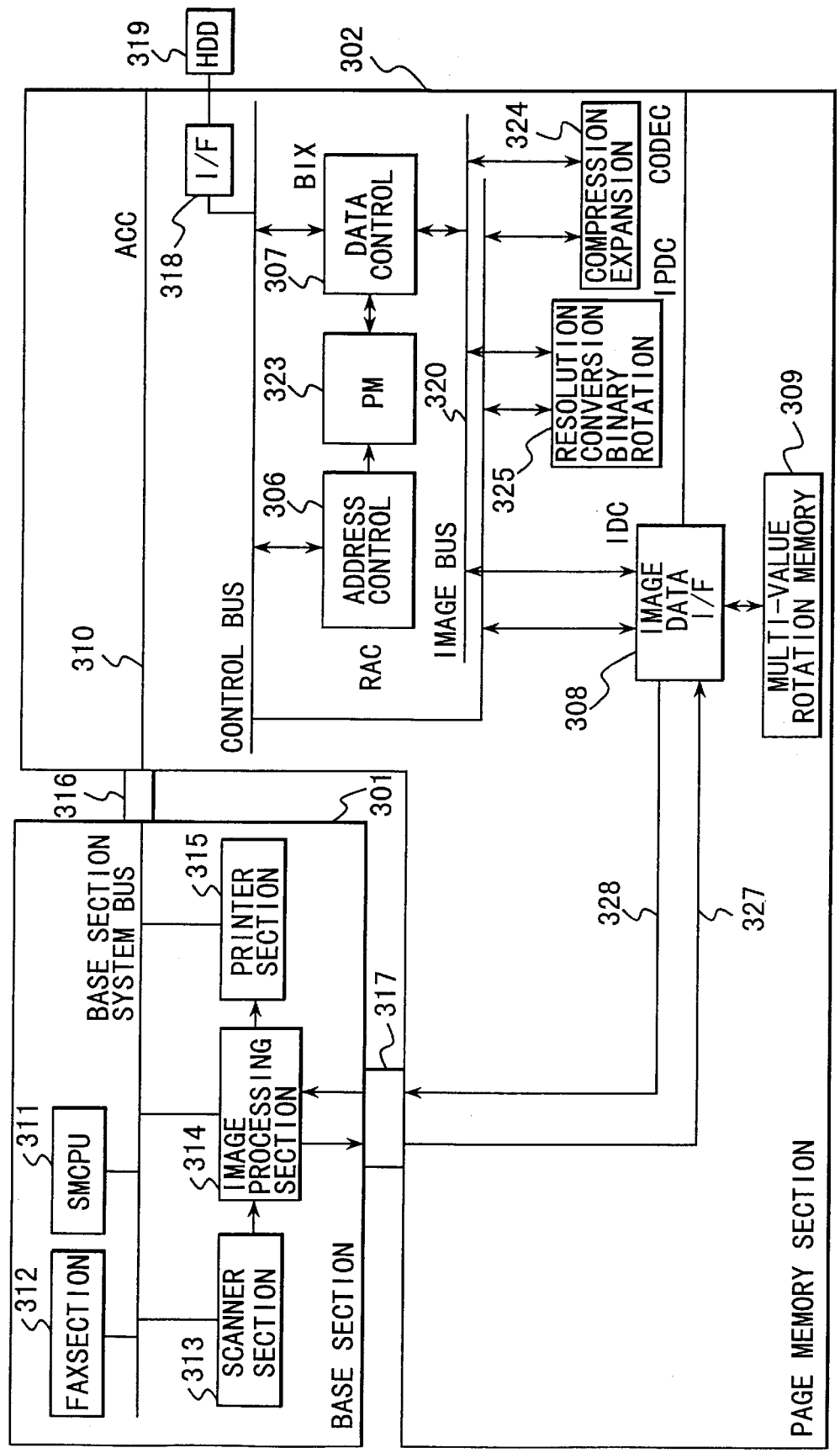
FIG. 2 is view showing a system structure of the image forming apparatus.
Figure 4:
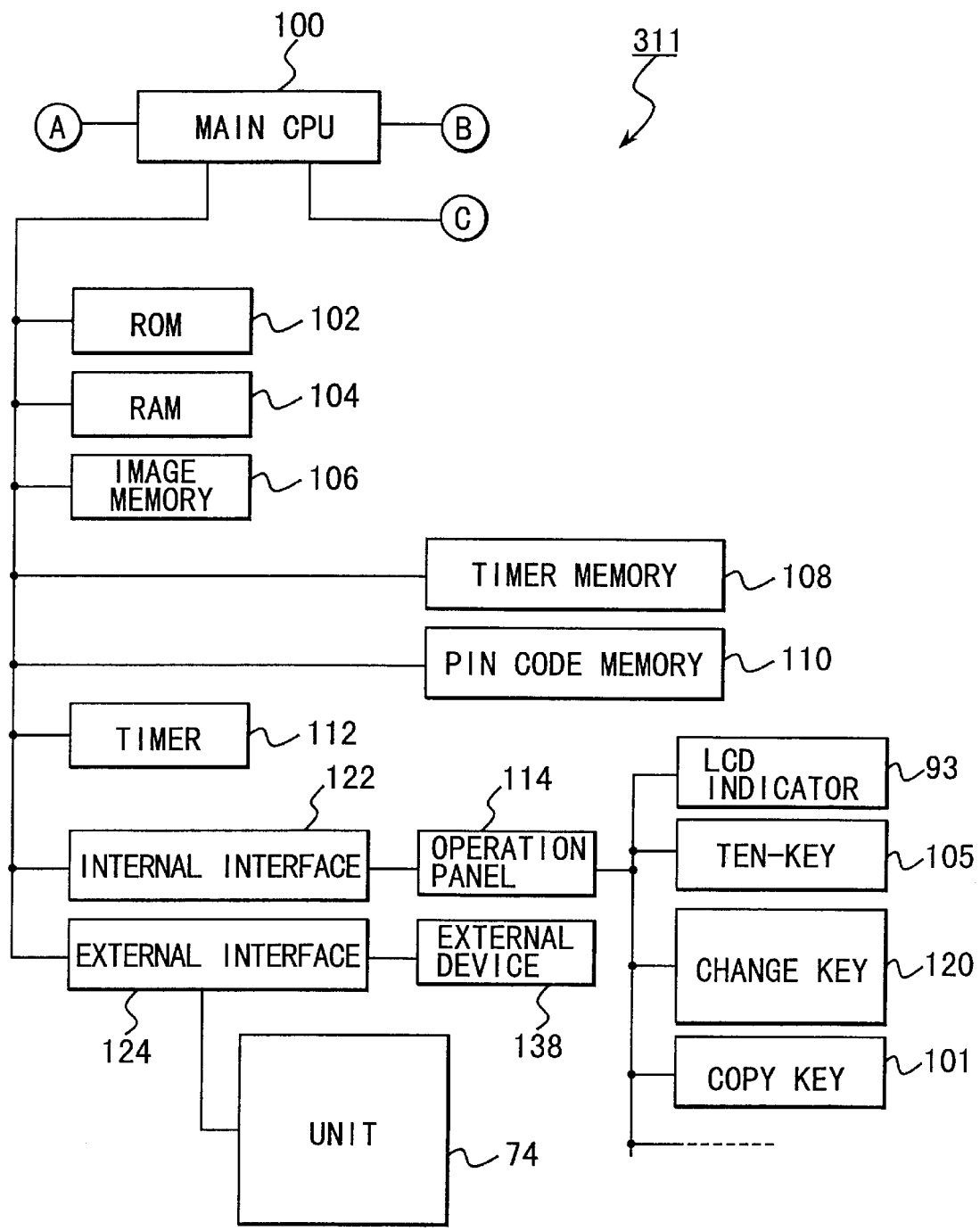
FIG. 4 is a block diagram showing the structure of an SMCPU.
Figure 5:
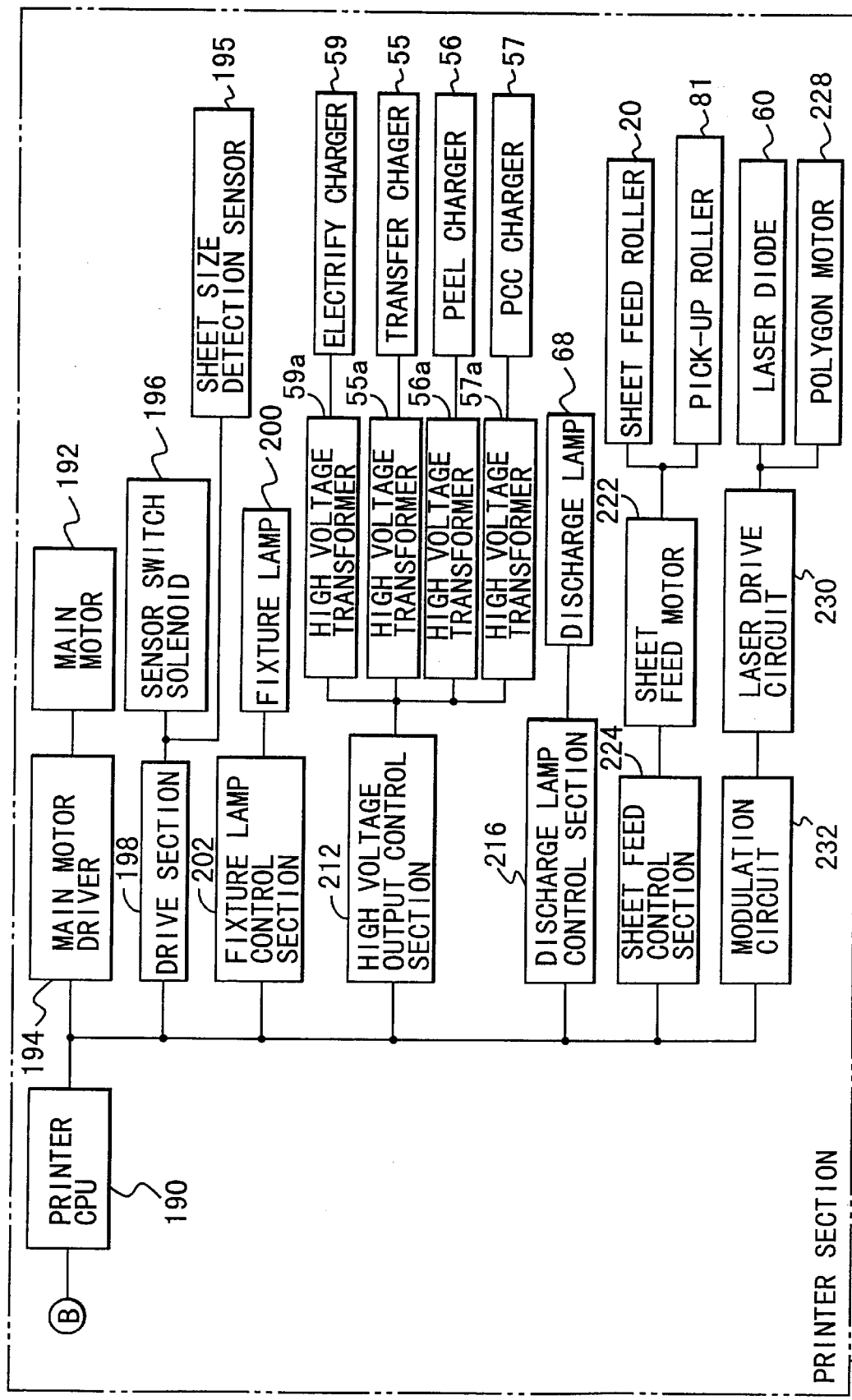
FIG. 5 is a block diagram showing the structure of a printer section.
Figure 6:
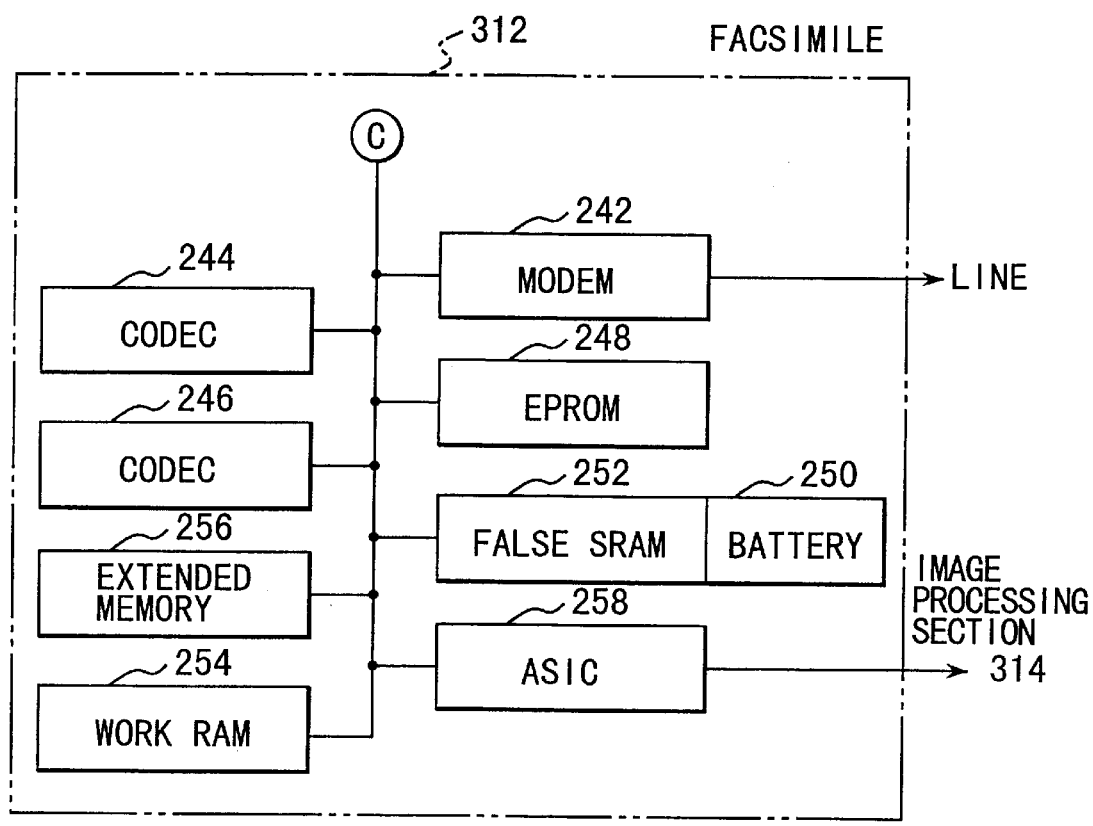
FIG. 6 is a block diagram showing the structure of a facsimile section.

In the next, a control circuit of the image forming apparatus will be explained with reference to FIGS. 2 to 6. FIG. 2 schematically shows the block diagram of an image forming memory device such as a digital copy control system or the like according to an embodiment of the present invention. FIG. 3 shows a scanner section. FIG. 4 shows a printer section. FIG. 6 shows a facsimile section.

The entire digital copy control system described above is roughly divided into two blocks. The scanner section 313 and the printer section 315 are connected with each other by an image processing section 314, and the system comprises a base section 301 constituting a digital copy machine including a facsimile section (FAX) 312 as a facsimile machine and a page memory section 302 for receiving and storing image data from the base section and for transmitting the image data to the base section 301, again, thereby to realize memory copy.

The base section 301 and the memory section 302 are connected with each other by a base system interface 316 for dealing with control data and a base section image interface 317 for dealing with image data. In addition, the page memory section 302 is connected with a hard disk 319 through an interface 318.

In the next, the base section 301 comprises an input means (or scanner) 313, an output means (printer) 315, an image processing means (or image processing section) 314, and a control means (SMCPU) 311 for controlling these means.

The main CPU of the control means is connected with a ROM 102, a RAM 104, an image memory 106, a timer memory 108, a PIN code memory 110, a timer 112, an internal interface 122, and an external interface 124. The internal interface 122 is connected with an operation panel 114. An LCD display device 93, a ten-key 100, a change key 120, a copy key 101, and the likes are provided on operation panel 114. The external interface 124 is connected with a unit 74 and an external device 138.

Here, storing and reading of image data are executed by a main CPU 100. For example, image data read by the scanner 2 under control of a scanner CPU 160 is stored in an image memory 106 in accordance with an instruction from the main CPU 100, when storing a PIN code and image data. The instruction from the main CPU 100 is executed by deciding a mode by an input (by keys) through the operation panel 114.

In the next, the specific structure of the scanner section 313 will be explained with reference to FIG. 3. The scanner CPU 160 of the scanner section 313 is connected with and controls a lamp control section 164 for controlling an exposure lamp 6, a motor driver 168 for controlling a scanning motor 166, a sensor including an original document size detect sensor 169, a drive section 172 for controlling and driving switches and solenoids 170. Further, the scanner CPU 160 is connected with and controls an A/D convert circuit 176 for executing image processing on image data from a CCD sensor 11 as a photoelectric element, a resolution convert circuit 178, a shading correct circuit 179, an image quality improve circuit 180, and a binarize circuit 182.

Next, the printer section 315 will be specifically explained with reference to FIG. 5. In the printer section 315, a printer CPU 190 is connected with a main motor driver 194 for driving a main motor 192, a sensor including a paper sheet size detect sensor 195, a switch, a drive section 198 for driving and controlling solenoids 196, a fixture lamp control section 202 for controlling a fixture lamp 200 of a fixture device 71, a high voltage output control section 212 for controlling an electrification charger 59, a transfer charger 55, a peel charger 56, and a PCC charger 57, a discharge lamp control section for controlling a discharge lamp 58, a paper sheet feed control section 224 for controlling a paper sheet feed motor 222 for a paper sheet feed roller 20 and a pick-up roller 81, and a modulation circuit 232 for controlling a laser drive circuit 230 for a laser diode 60 and a polygon motor 228. The printer CPU 190 controls the above respective sections connected. High voltage transformers 59a, 55a, 56a, and 57a are respectively provided between the high voltage output control section 212 and the electrification charger 59, the transfer charger 55, the peel charger 56, as well as the PC charger 57.

In the next, the page memory section 302 will be specifically explained with reference to FIG. 2. The page memory section 302 is connected with a memory means (or page memory PM) 323, an address control section 306 for generating an address for the page memory 323, an image bus 320 for performing data transfer between each other of the devices in the page memory section, a data control means 307 for controlling data transfer when data is transferred between the page memory 323 and the other devices through the image bus 320, an image data I/F means 308 which serves as an interface for image data when image data is transferred from or to the base section 301 through the base section image interface 317, a resolution convert/binary rotation means 325, a compress/expand means 324, and an image data I/F means 308. The resolution convert/binary rotation means 325 converts image data in compliance with a different resolution when transmitting image data to a device adopting a different resolution or converts image data received from a device adopting a different resolution, in compliance with a resolution applying to the printer section 315 of the base section 301, and executes 90-degree rotation processing on binary image data. The compress/expand means 324 compresses inputted image data in compliance with devices which transmit or store data compressed, such as facsimile transmission or optical disk storage, or expands image data of a compressed format so that the image data can be visualized by the printer section 315. The page memory section 302 further comprises a multi-value rotation memory 309 used for outputting image data rotated by 90 or −90 degrees when outputting image data through the printer section 315.

The facsimile section 312 will now be explained with reference to FIG. 6. The facsimile section 312 is connected to a public line and comprises a modem 242 as a modulator/demodulator for analogue line connection, a CODECs 244 and 246 as an encoder/decoder for binary image data, an EPROM 248 for communication control programming, a dummy SRAM 252 as a memory means with a back-up battery 250, a work RAM 254 used for performing various processing on image data, an extended memory 256, and an ASIC 258 as an interface for outputting facsimile receive data to an image processing section 314.

Figure 7:
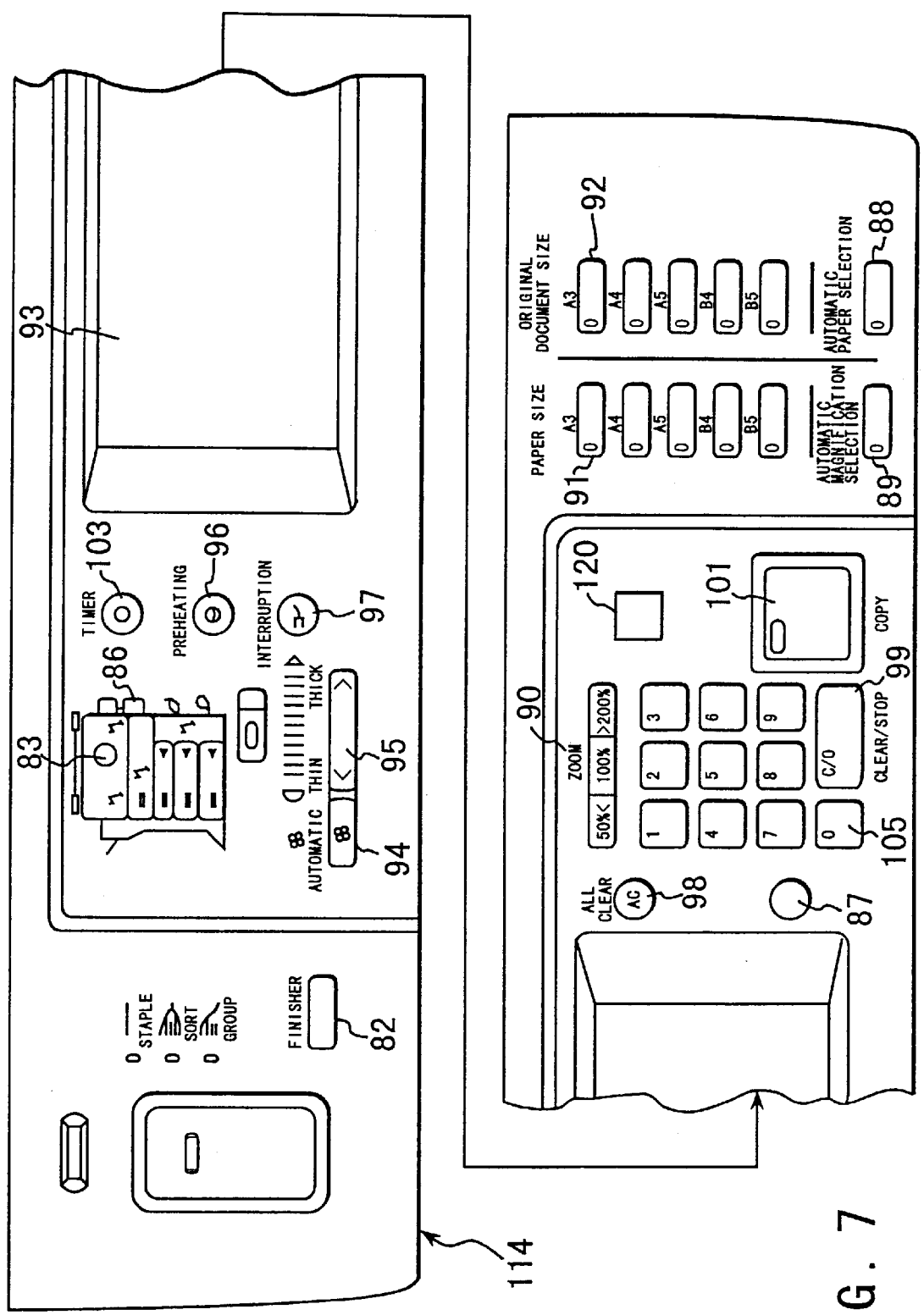
FIG. 7 is a view showing the structure of an operation panel.

FIG. 7 shows a structure of an operation panel 114. Specifically, the operation panel 114 comprises a finisher key 82, a display panel 83, a cassette select key 86 as a means for selecting a paper sheet feed cassette 30, an operation guide key 87, an automatic paper sheet select key 88, an automatic magnification select key 89, zoom/100% keys 90, original document size keys 91, a paper sheet size keys 92, an automatic density key 94, manual density keys 95, a pre-heat key 96, an interruption key 97, an all-clear key 98, a clear/stop key 99, a copy key 101, a timer key 103, ten-keys 105, and a change key 120.

The finisher key 82 is used to select any of a sort mode, a group mode, and a staple mode.

The display panel 83 displays and flickers various figures and characters representing a state of the copy machine.

The cassette select key 86 can be pressed to select a different cassette, for example, when a cassette already selected is not of a desired size.

The operation guide key 87 is arranged such that messages showing operation procedures are displayed when pressed as a "HELP" key and setting states can be confirmed when pressed after functions are set.

The automatic paper sheet select key 88 is normally set in an automatic paper sheet select mode. This key is used to automatically detect the size of original document set on the original document table 5 (on the glass) and to automatically select paper sheets having the same size as the original thus detected (only in case of a real size magnification copy).

When the automatic magnification select key 89 is pressed to select an automatic magnification select mode and a size of paper sheets is specified, the size of a original document set on the original document table 5 (on the glass) is detected and the copy magnification is automatically calculated.

Among zoom/100% keys 90, a "25%<" key can be pressed to reduce the copy magnification to 25% in units of 1%. When a ">800%" key is pressed, the copy magnification can be increased to 800% in units of 1%. When the "100%" key is pressed, the magnification is set to a real size (of 100%).

The paper sheet size key 92 is used to select a paper sheet size.

The LCD display 93 displays the state of the electronic copy machine, operation procedures, and various instructions for users, in form of characters and figures. The LCD display 93 as a display means includes a touch panel and can also be used to set functions.

When an automatic density is selected by the automatic density key 94, the electronic copy machine automatically detects the color density of an original document and selects an optimal copy density.

With the manual density keys 95, a desired copy density can be selected with respect to a manual density. The density can be decreased in five stages by pressing a "light" key and can be increased in five stages by pressing a "dark" key.

When the pre-heat key 96 is pressed, the machine is brought into a pre-heat (or power save) state and all the display lamps are turned off. When copy is carried out again, this button is pressed again.

The interruption key 97 is used to carry out interruption copy during continuous copy.

The all-clear key 98 can be pressed to clear all the selected modes and the machine recovers a standard state.

The copy key 101 is pressed to start copy. When the timer key is pressed, the times at which the electronic copy machine is powered on and off are displayed (in case where a weekly timer is set).

Ten keys are used to set the number of copies to be taken. The number of copies can be set within a range of 1 to 999 sheets. In addition, the ten keys can be used to dial a number in facsimile communication.

The change key 120 is used to alternately turn on and off a change flag, by cyclically pressing down the change flag.

In the following, explanation will be made to operation of the structure described above, with reference to FIGS. 8A and 8B, where two sets of copies are prepared from original documents of three pages.

Figure 8A:
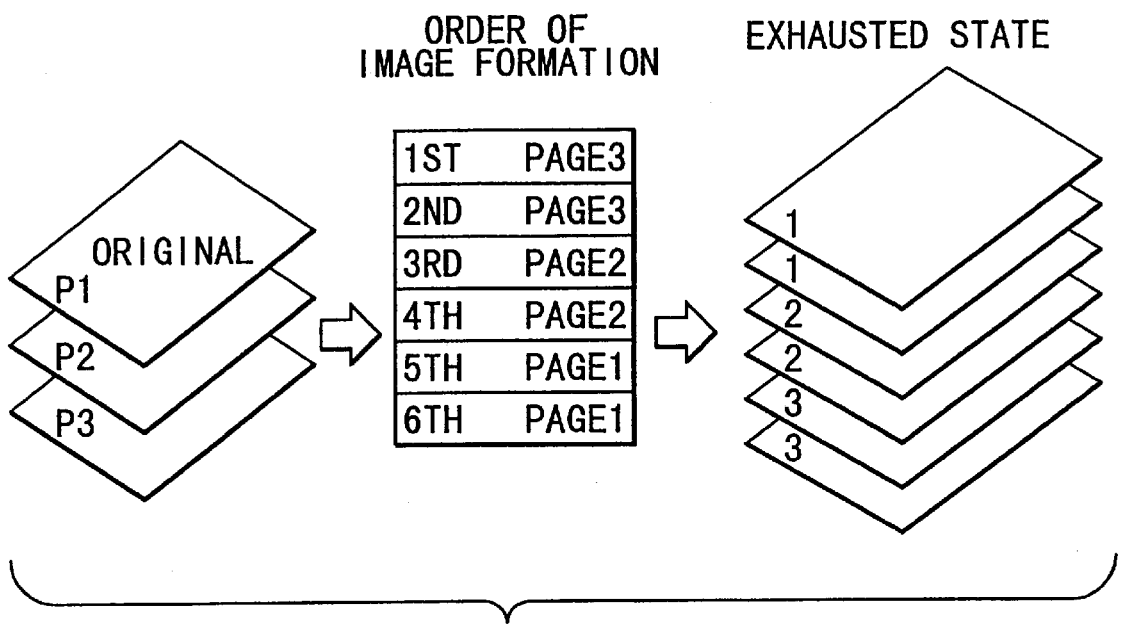
FIGS. 8A and 8B are views for explaining an electronic sort function.

In FIG. 8A, the original documents are fed from the automatic original document feed device 4 to an original document reading position in the order of P3, P2, P1, and copies are stacked on a tray of the unit 74, in the order of 1, 1, 2, 2, 3, 3 from the upper side.

Figure 8B:
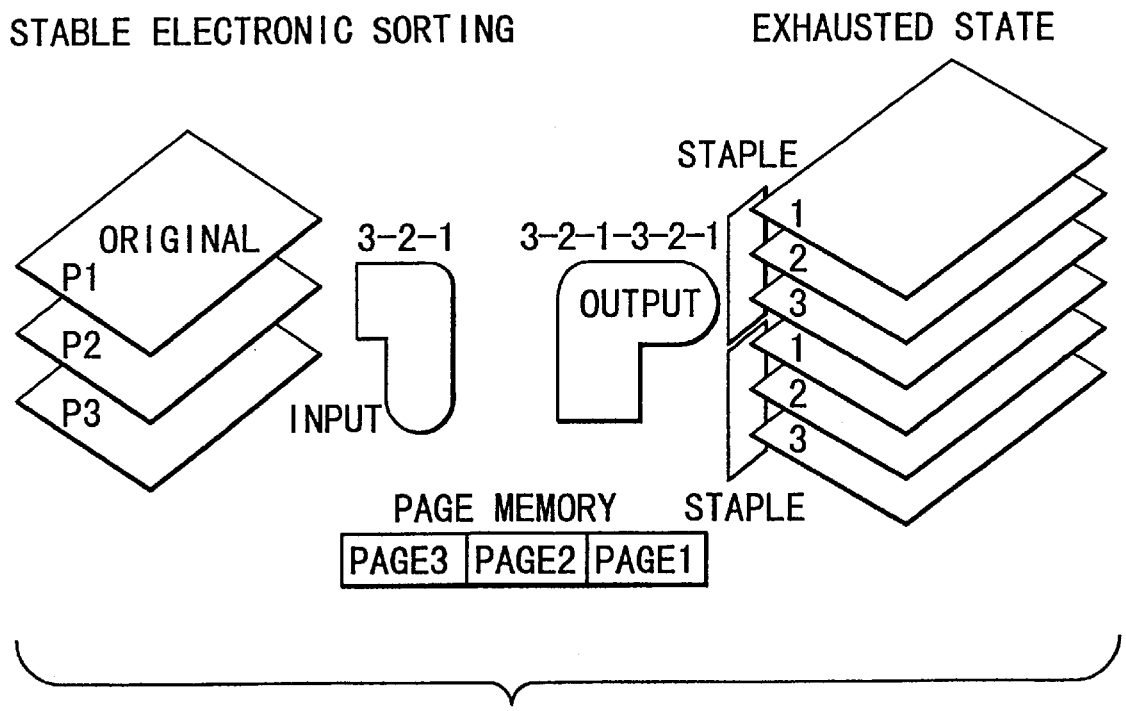

As shown in FIG. 8B, in case of taking copies with use of staple electronic sort, original documents are fed from the automatic original document feed device to the original document reading position in the order of P3, P2, P1, and images are read into the page memory 323 in the order of 3, 2, 1 by the scanner 2. Subsequently, images are outputted from the page memory 323 to the printer in the order of 3, 2, 1, and thereafter, these copies are stapled and fed out onto the tray of the unit 74. Likewise, images are outputted again from the page memory 323 to the printer 3, and copies are thereafter stapled and fed out onto the tray of the unit 74. The sheets of copies thus fed out onto the tray of the unit 74 are stapled and layered in the order of 1, 2, 3 from the upper side. An operator can thus obtain two sets of copies of the original documents.

Figure 9:
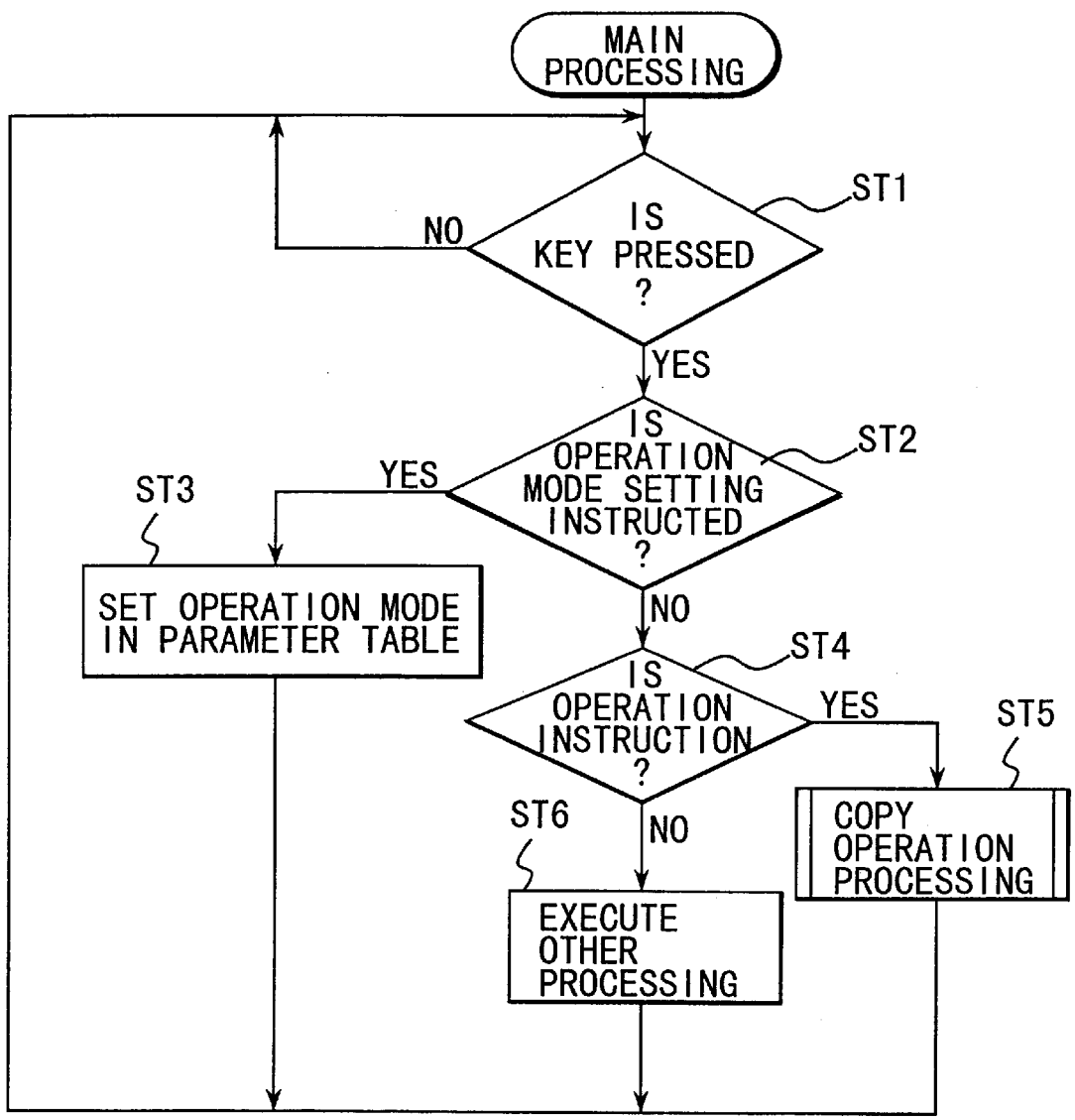
FIG. 9 is a flow-chart for explaining the entire control operation of the digital copy machine.

In the next, the entire control operation of the digital copy machine according to the present embodiment will be explained with reference to the flow-chart shown in FIG. 9.

An operator presses a key on the operation panel 114 as a setting/instruction means (ST1). Then, in case where an operation mode is set (ST2), the main CPU 100 writes a copy mode specified into a parameter table of the RAM 104 (ST3). Thus, the number of sets to be copied, the size of the original document, the size of paper sheets, the magnification, the sort mode, and the likes are stored. Note that predetermined values are set in the parameter table of the RAM 104 when the machine is powered on. As for those parameters relating to copy operation which are not particularly specified, the machine operates with use of the predetermined values (ST4 and ST5). The other processing which does not apply to copy operation or copy mode setting includes setting of a timer 112 and pre-heating (ST6).

Figure 10:
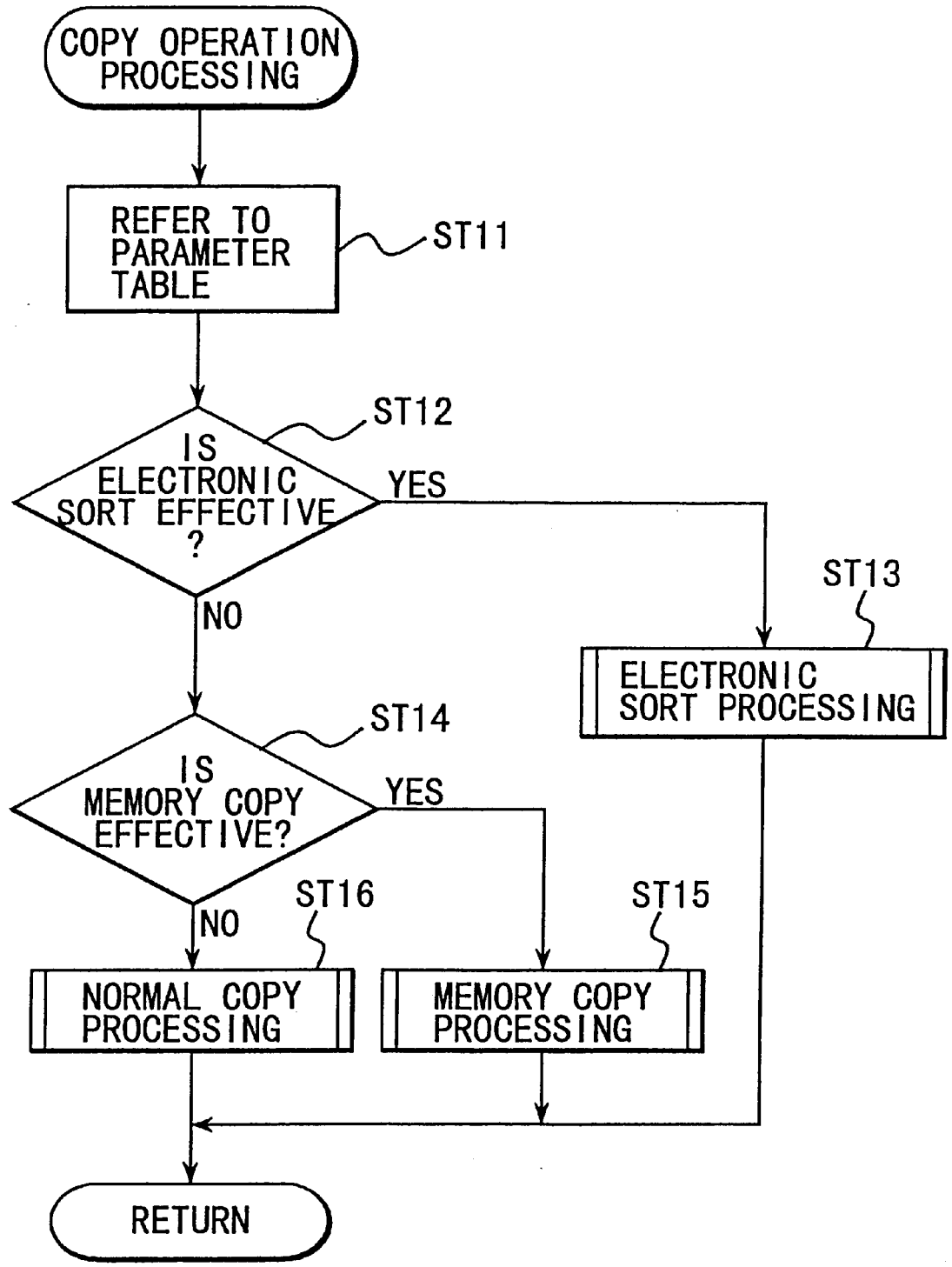
FIG. 10 is a flow-chart for explaining copy operation processing.

In the next, copy operation processing in step ST5 will be explained with reference to the flow-chart of FIG. 10.

In case of a digital copy machine having a page memory 323 like the present embodiment and capable of electronic sort, the copy operation processing is roughly divided into electronic sort processing (ST13) in which images are stored into the page memory 323 and sort printing is performed, memory copy processing (ST15) in which images are once stored into memory and then directly printed, and normal copy processing (ST16) in which images inputted from original documents are directly printed without use of a memory. The main CPU 100 determines which processing is set in the beginning of the copy operation processing and then executes the copy operation.

Note that explanation of the memory copy processing in step ST15 and the normal copy processing in step ST16 will be omitted herefrom.

Figure 11:
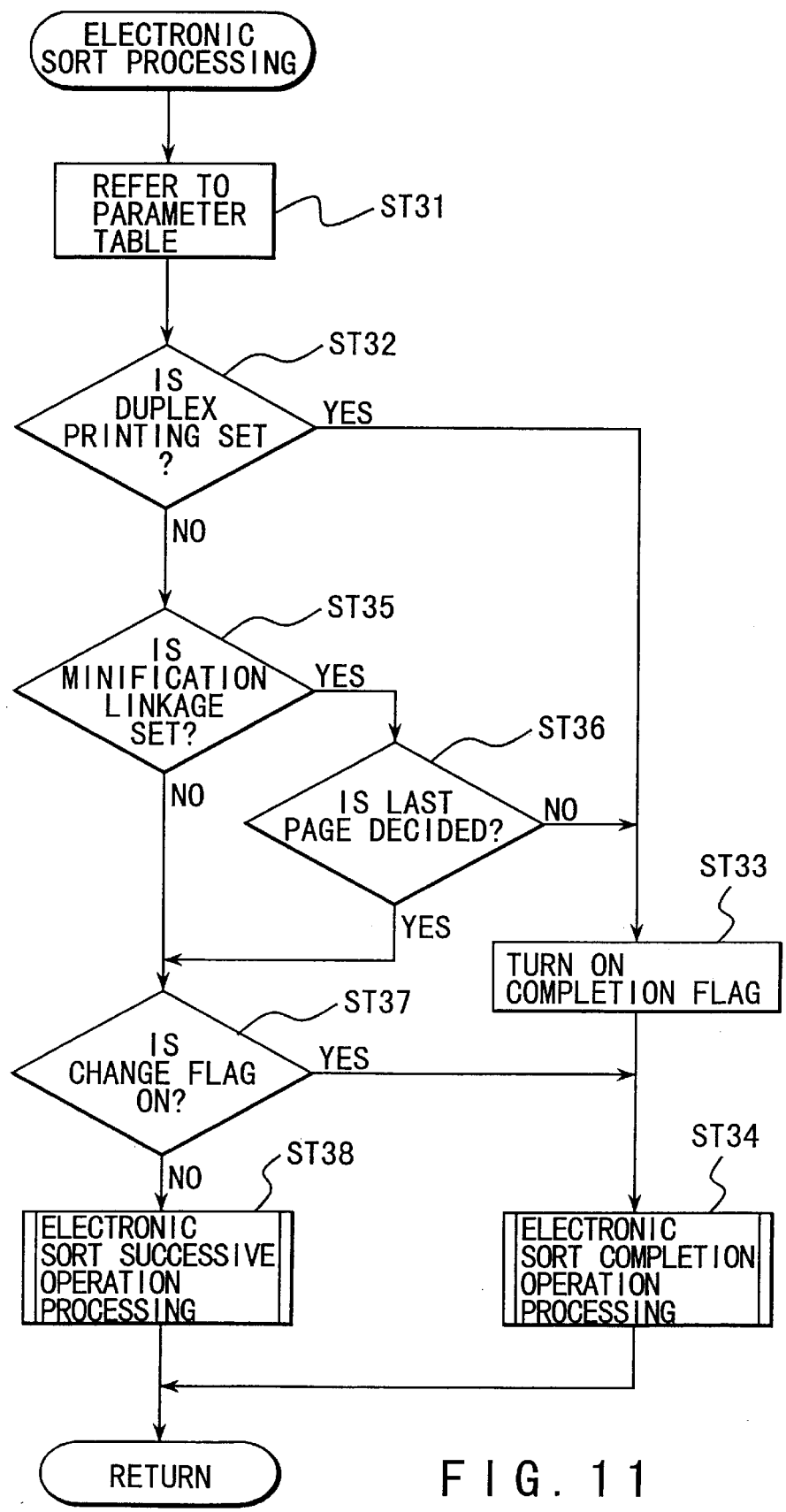
FIG. 11 is a flow-chart for explaining electronic sort processing where the electronic sort processing is selected.

In the next, electronic sort processing will be explained with reference to the flow-chart of FIG. 11 where the electronic sort processing of step ST13 is selected.

At first, the main CPU 100 refers to the parameter table in the RAM 104. If duplex printing is set or if minification linkage is set and the number of original documents to be inputted is not specified, the main CPU turns on a completion flag (ST33) and executes electronic sort completion operation processing (ST34) in which printing is started after all the original documents are read in.

Here, if an input instruction from the top page is set, electronic sort completion operation processing is executed.

In the other setting, i.e., if duplex printing is not set and minification linkage is not set (ST35), or if minification linkage is set, the last page is decided (ST36), and the change flag is not turned on (ST37), electronic sort successive processing is executed in which a first set is printed while reading in original documents (ST38).

Note that turning on and off of the change flag are switched alternately by pushing down the change key 120 of the operation panel 114.

In the next, the electronic sort completion operation processing (ST34) will be explained with reference to the flow-chart shown in FIG. 12.

At first, the main CPU 100 refers to the parameter table in the RAM 104 to set the operation mode of the stapler 74c in the unit 74. The operation mode is selected from a sort mode, a staple mode, a group mode, and a non-sort mode. Explanation of the group mode and the non-sort mode will be omitted herefrom.

The CPU 100 firstly initializes the number of the page memory 323 for reading and storing images (ST42). The page memory 323 is divided into a page buffer region M1 where image data of an original document read by the scanner 2 is written, and a file area M2 divided into units of pages where data obtained by compressing image data is written. An address control section 306 refers to data head address for every file area page in the order of page memory numbers.

When reading of original documents is started, an empty sensor 29 as an original document detect sensor in the automatic original document feed device (ADF) 4 is checked. If an original document is present and the completion flag is turned on (ST44), completion operation ADF input processing is executed (ST46) after turning off the completion flag (ST45). In this completion type processing, if the completion flag has been turned off, the change flag was turned off in the step ST37 in FIG. 11.

If original document input operation is started from the automatic original document feed device 4, original documents are always inputted in the order from the last page (or the lowest one of the layered original documents). Therefore, if only the change flag is a factor causing completion operation, the change key 120 is pressed down to turn off the change flag (ST50), and the processing is changed to electronic sort successive operation in which pages are not changed.

Explanation will now be made to the screen display for instructing page change according to the present invention.

Figure 27:
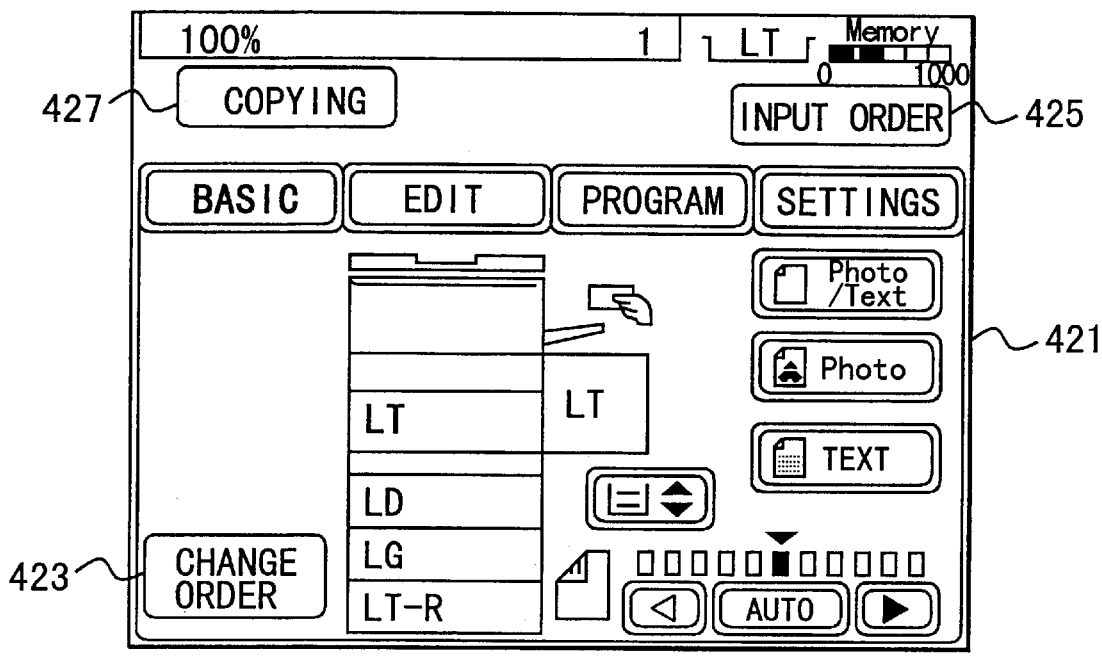
FIG. 27 shows an example of a display screen of an operation panel indicating an order change icon in page change processing when inputting an original document, according to the present invention.
Figure 28:
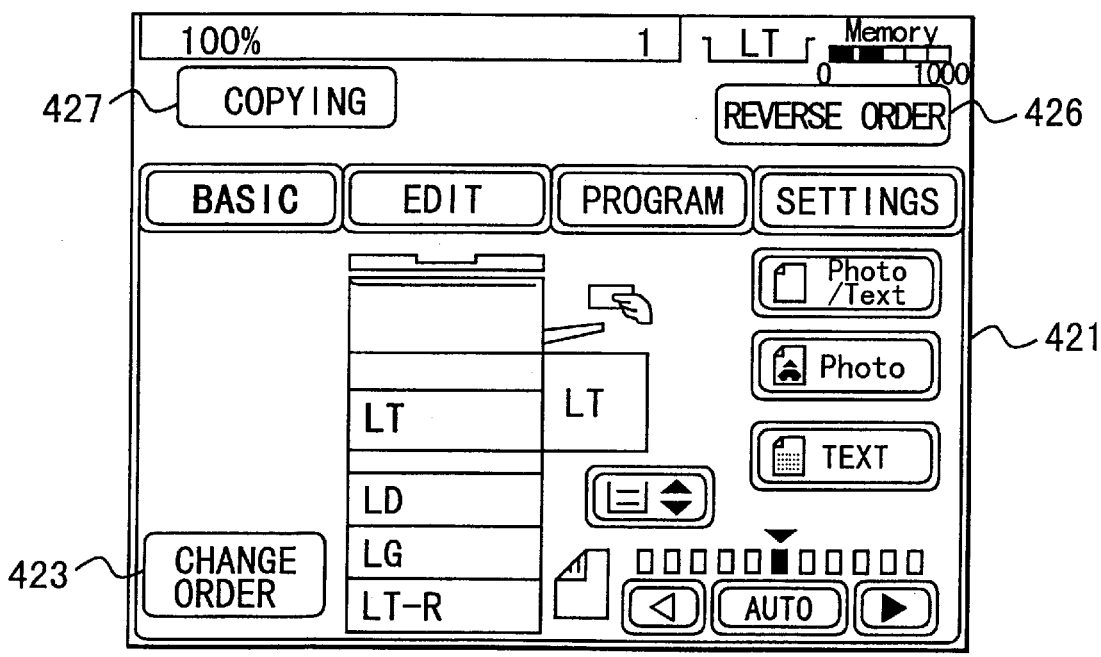
FIG. 28 shows an example of a display screen of an operation panel indicating an order change icon in page change processing when inputting an original document, according to the present invention.

FIG. 25 shows an example of the display screen of the operation panel indicating an order change icon for page change processing according to the present invention, when inputting original documents. FIG. 26 shows an example of the display screen of the operation panel indicating an order change icon for the page change processing according to the present invention, when inputting original documents. FIG. 27 shows an example of the display screen the operation panel indicating an order change icon for the page change processing according to the present invention when printing images. FIG. 28 shows an example of the display screen of the operation panel indicating an order change icon, when printing images.

In FIG. 25, the LCD display device 93 is made display an operation screen 401 by the operation panel 114, when reading original documents. This screen displays "READY" 409 indicating a original document inputting state as preparation for printing, and further displays instruction icons "YES" 407 and "NO" 408 for determining whether or not a next original document exists. When the icon "YES" 407 is touched, the machine is brought into a waiting state for a next original. If the "NO" icon is touched, the original documents are regarded as having been completely imputed and the printing processing is carried out.

In addition, as a mode of the printing order according to the present invention, the "INPUT ORDER" 405 indicates that the current print order is the input order in which original documents are inputted. Further, a page change instruction icon 403 is used to change the print order while inputting original documents. If the initial state is set to the input order of original documents, the print order is set to the reverse of the input order of the original documents by touching the page change instruction icon 403, i.e., the indication is changed to "REVERSE ORDER" 406.

Even when an error in the input order of original documents is found from the display of the LCD display device 93 of the operation panel while inputting original documents, original documents can be printed as specified by operating the page change instruction icon 403, without inputting again the original documents.

If there is no original document on the ADF (ST43), the page change instruction screen 401 is updated (ST62), and the page change instruction screens 401 and 421 shown in FIGS. 25 and 26, which are characteristic features of the present invention, are updated on the operation panel 93. In the next, the original document on the original document table (or glass) 5 is subjected to scanning (ST52), and page data in the page buffer region M1 in the page memory 323 is compressed and stored into the file area M2 (ST53). The storage address is written into the page memory number.

Subsequently, the main CPU 100 checks key inputs (ST54), and executes image reading again if an input start is instructed. If an end is instructed, the original document input processing is terminated and print processing is executed (ST48). If a stop is instructed, data in the page memory is cleared and electronic sort processing is terminated. In addition, during completion operation manual set original document input, according to the present invention, an instruction of change and a cancellation of the instruction can be alternately instructed by the change key 120. When an operator finds that original documents have been inputted from the first page, in the completion operation, an instruction of change can be inputted at any time. On the contrary, cancellation is possible even when input of original documents from the top page has been specified at first. Note that steps ST58 to ST61 for instructing change can be executed in the electronic sort successive operation processing. Other instructions by keys are interruption and the like.

Figure 14:
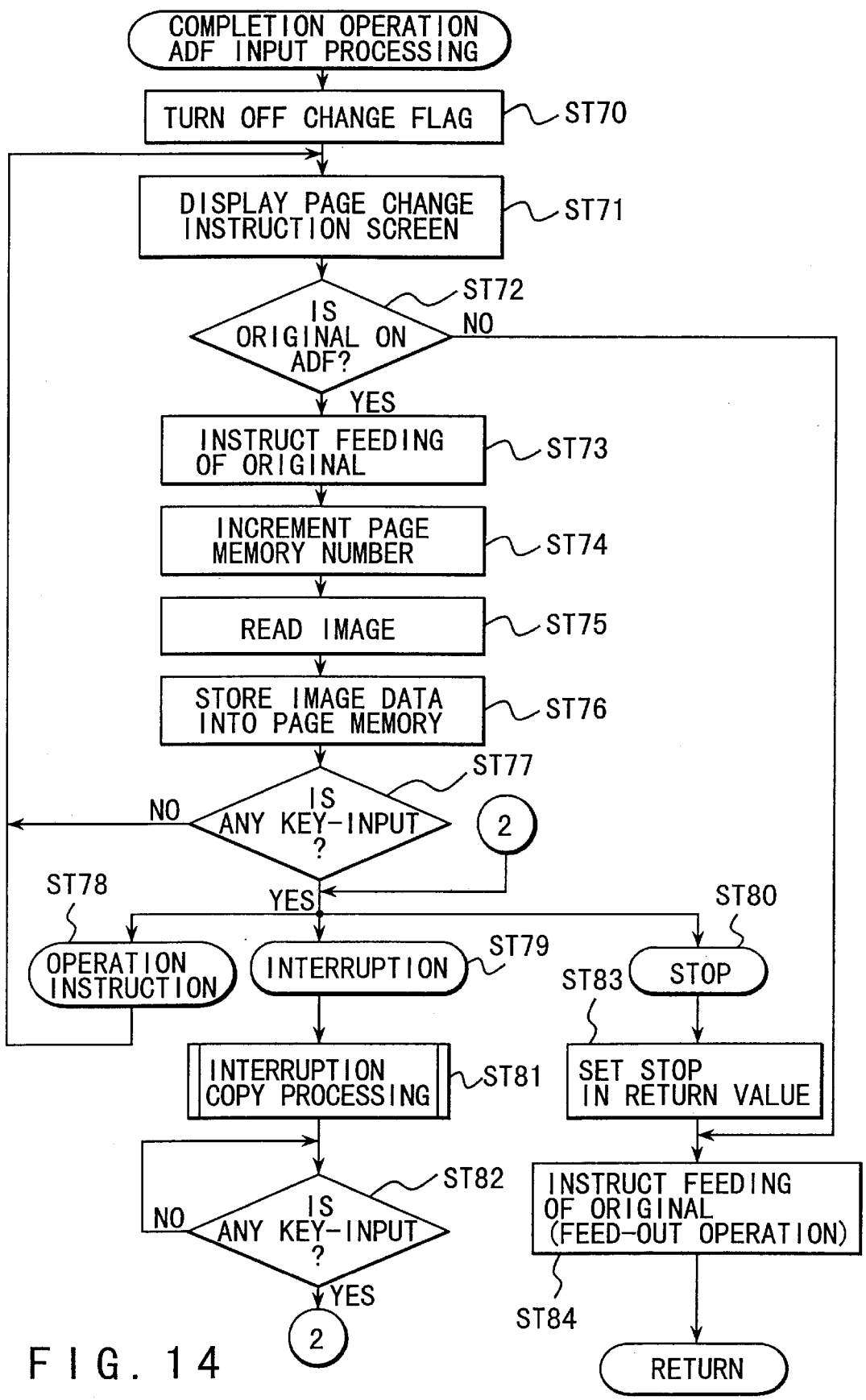
FIG. 14 is a flow-chart for explaining electronic sort completion operation ADF input processing.

In the next, electronic sort completion operation ADF input processing in step ST46 will be explained with reference to the flow-chart in FIG. 14.

In case of inputting original documents with use of the automatic original document feed device 4, original documents are read in from the last page even in a completion type, and therefore, the change flag is firstly turned off by pressing the change key 120 (ST70). Subsequently, a page change screen 401 shown in FIGS. 27 and 28, which is a characteristic feature of the present invention, is displayed. Further, the same processing as the electronic sort completion operation processing shown in FIG. 12 is carried out except that original documents are fed and read in until no original documents remains in the automatic original document feed device 4 (ST72 to ST76). However, the machine does not wait for key inputs during execution of this processing. When any of effective keys, i.e., operation instruction (ST78), interruption (ST79), and stop (ST80) is specified during execution, corresponding processing is carried out.

In ST71, since a page change instruction screen 401 is provided, even if an operator finds out that original documents have been inputted in a wrong input order, the print mode can be changed by touching the page change instruction icon 423. Thus, print processing can be carried out in a desired print order without operation of inputting again all the original documents.

Figure 15:
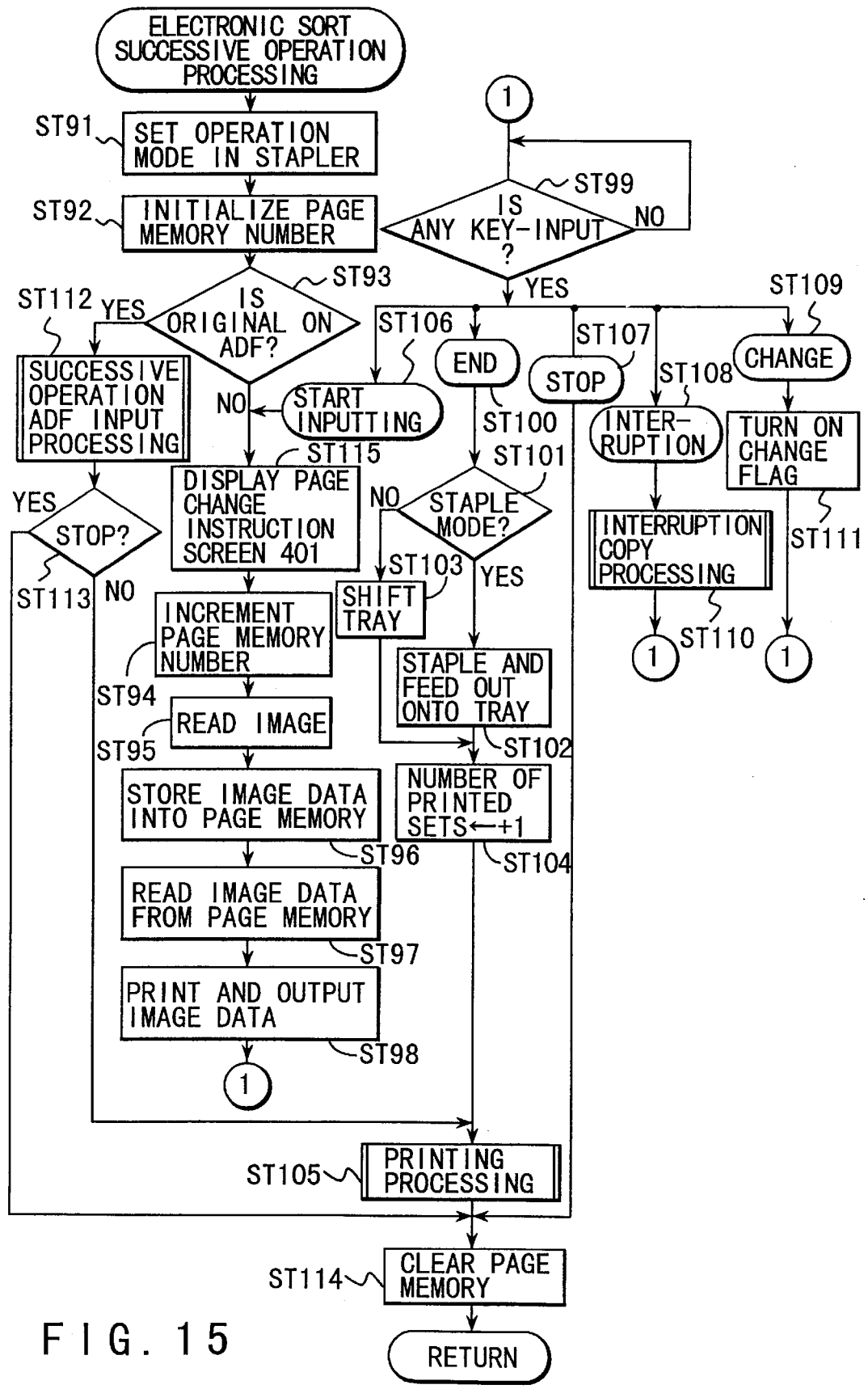
FIG. 15 is a flow-chart for explaining electronic sort successive operation processing.

Next, electronic sort successive operation processing will be explained with reference to the flow-chart shown in FIG. 15.

Figure 12:
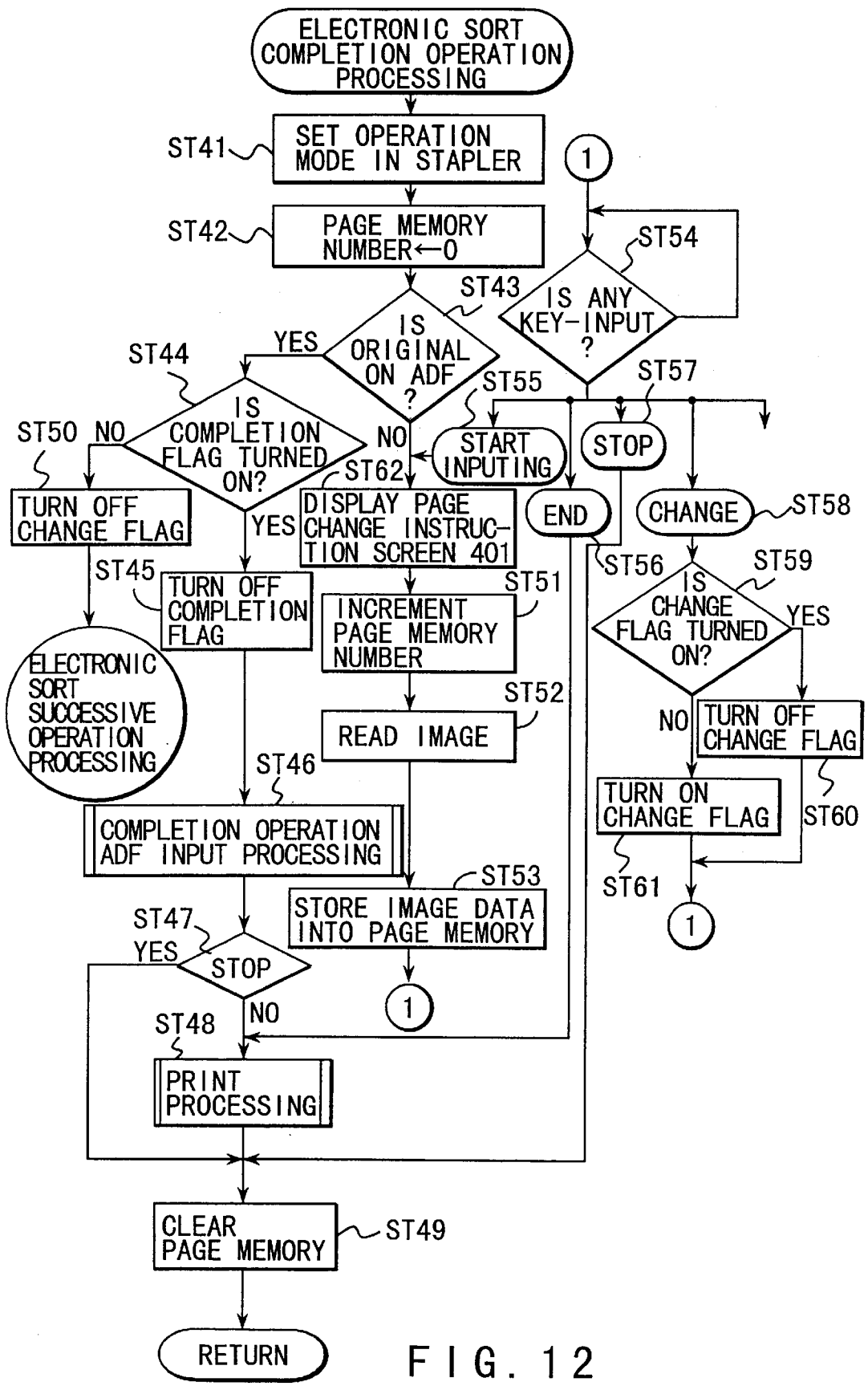
FIG. 12 is a flow-chart for explaining the electronic sort completion operation processing.

The main CPU carries out the same processing as shown in FIG. 12 until image images are read in and stored with page memory numbers (ST91 to ST96). In these processing steps, the page change instruction screen 401 which is a characteristic feature of the present invention is displayed and the machine waits for a change instruction from an operator (ST115). Since the change flag has already been turned off before the flow enters into successive processing, operation for the change flag is not carried out in case of the successive operation processing.

Subsequently, the main CPU 100 expands and develops page data stored in a specified address of the page memory, by means of the compression/expansion means 324 (ST97). The developed image data is printed (ST98) and thereafter waits for a key input (ST99). Input start (ST106), end (ST100), stop (ST107), interruption (ST108), and change (ST109) are instructed.

When end is instructed after waiting for a key input, reading of original documents and printing of the first set end. In case of a staple mode, the paper sheet currently being fed out is stapled by the stapler 74c of the unit 74 and is fed out onto the feed-out tray 74a (ST102). In case of a sort mode, the feed-out tray 74a of the unit 74 is shifted (ST103) and the count of the number of printed sets is incremented (ST104). Thereafter, print processing is carried out (ST105).

In this procedure of checking thus key inputs, there is no means for instructing change as in the completion type shown in FIG. 12. In case of this above successive operation (ST112), printing of the first set is directly carried out in parallel after original documents are inputted, and therefore, it is impossible to perform printing with the print order changed in view of the operation. In addition, since images of the first set are formed immediately, it is relatively easy to check the order of the paper sheets fed out, so that a user can soon find out this order. Therefore, change processing is not particularly necessary.

Figure 16:
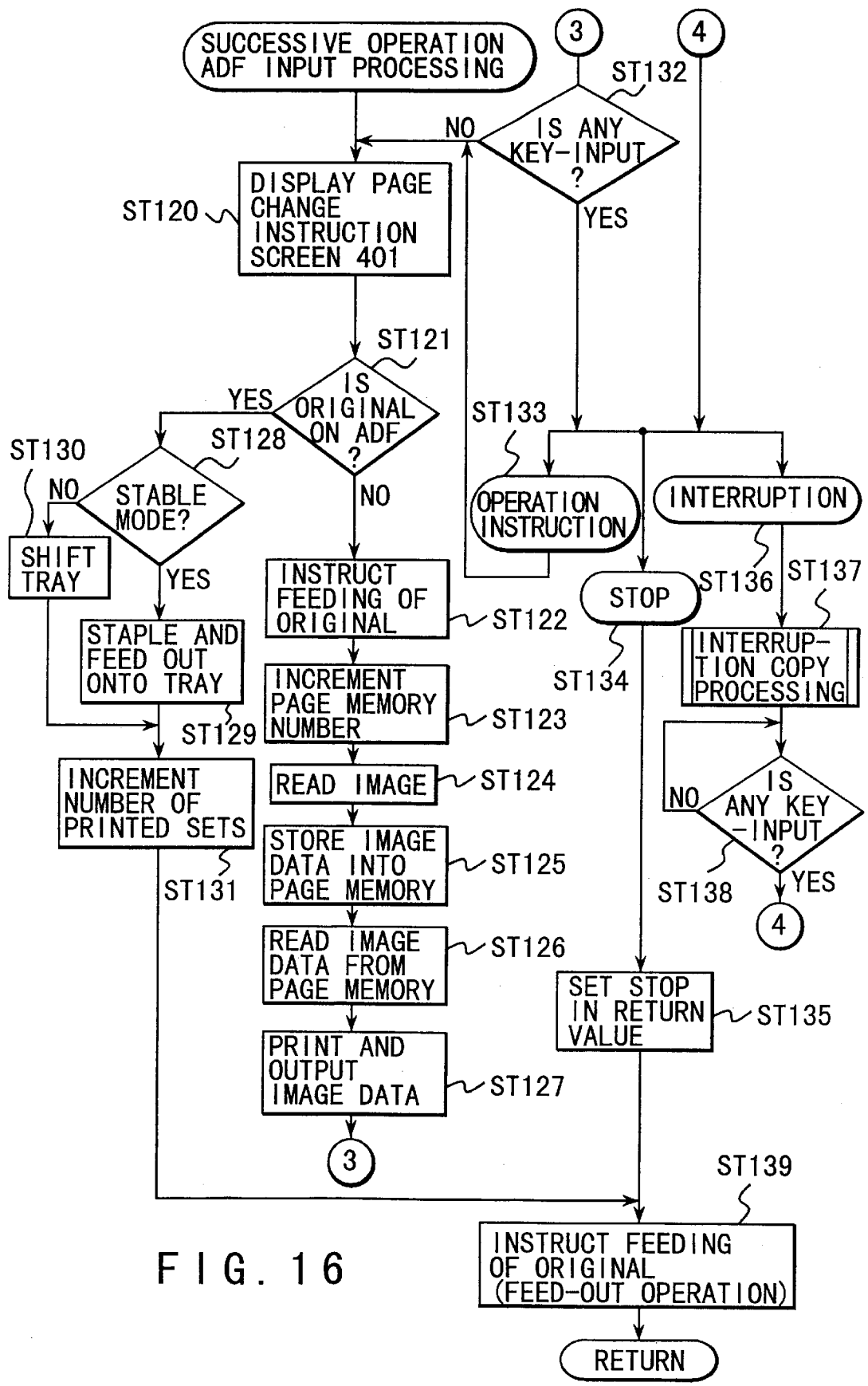
FIG. 16 is a flow-chart for explaining successive operation ADF input processing.

FIG. 16 shows successive operation ADF input processing in step ST112.

In the successive operation ADF input processing, the page change instruction screen 401 as a characteristic feature of the present invention is displayed and an icon for waiting for a page change instruction from an operator is indicated on the display (ST120).

In the next, the print processing in step ST48 after the completion operation input processing shown in FIG. 12 and the print processing in step ST105 after completion of the successive input shown in FIG. 15 and after end of print operation of the first set will be explained with reference to the flow-chart.

If the change flag is turned on at the top of the electronic sort print processing (ST142), the main CPU 100 executes page change processing (ST143) and turns off the change flag (ST144). In the next, the page memory number is set to 1 (ST145).

Further, the page memory change instruction screen 421 as a characteristic feature of the present invention is displayed on the control panel 93 and a state of waiting for a page memory change instruction from an operator is maintained (ST162).

Here, the page change instruction will be explained below with use of FIGS. 27 and 28 where an indication of "COPYING" 427 representing printing is currently displayed in the display screen 421. Further, an indication of "INPUT ORDER" means that the current output mode is an original document input order. By touching an indication of "CHANGE ORDER", an indication of "REVERSE ORDER" shown in FIG. 28 is displayed and the print order is set to the reverse of the original document input order.

In the document feeding by the ADF, so the input order of the documents is determined from the last page, displaying and controlling being "INPUT ORDER" turns default. Conversely, on putting the documents by hand, displaying and controlling being "REVERSE ORDER" turns default, because the input order of the documents is usually determined from the first page.

In this manner, the print order can be changed for every set to be printed even during printing. Therefore, if an operator finds that the input order is wrong during printing in the electronic sort mode, for example, the operator can make a page change instruction as described above, and then, all the image data can be printed again in the reverse order from the next set of copies.

Page data stored at a specified address of the page memory number in the page memory 323 is expanded and developed in the page buffer by compression/expansion means 324 (ST148), and the developed image data is printed (ST149). Thereafter, key inputs are checked (ST151).

If interruption (ST152), stop (ST153), operation instruction (ST154), or change (ST161) which is effective during execution of printing is instructed, corresponding operation is carried out. Operation instructions and setting other than these ones effective during executing printing are considered as no keys having been pushed, if any.

During execution of printing, a change instruction is not effective. While printing images, the page memory number of the page memory 323 is incremented. Upon completion of printing of the last page, staple feed-out (ST157) is carried out to staple copies with use of the stapler 74c and feed out the copies onto the feed-out tray 74a or tray shift (ST158) is carried out to shift the feed-out tray 74a. These operations are performed until printing is completed for the number of specified sets set in the parameter table or until stop is instructed.

Figure 18:
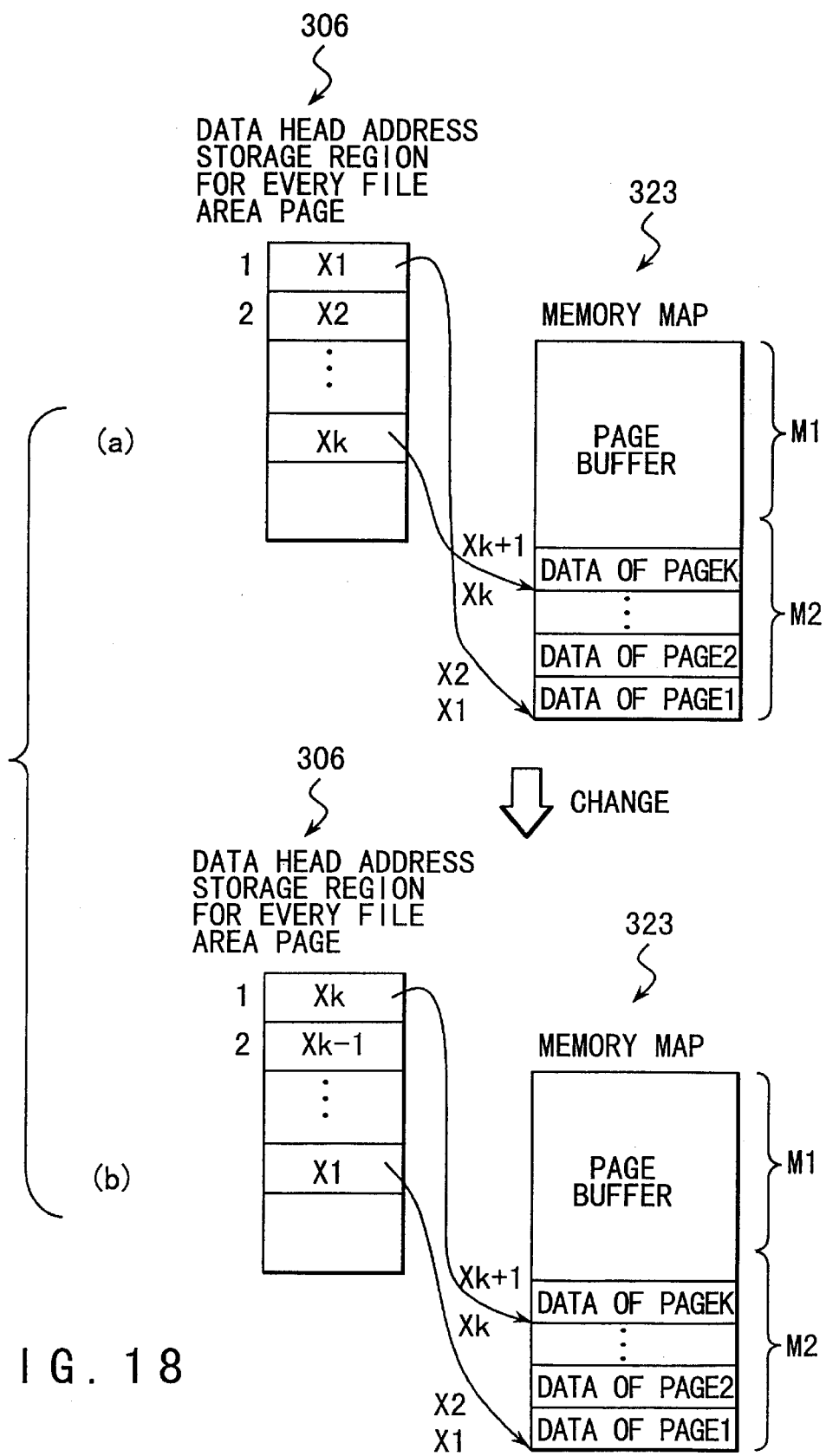
FIG. 18 is a view showing the structure of storage regions stored in a page memory.

FIG. 18 shows the concept of the page change processing. As shown in FIG. 18 at (a), data head address storage regions x1, x2, . . . xk for respective file area pages in the address control section 306 respectively correspond to data of page 1, . . . data of page K in the file area in the page memory 323. These orders are reversed as shown in FIG. 18 at (b), e.g., data head address storage regions xk, xk–1, . . . x1 for respective file area pages in the address control section 306 respectively correspond to the data of page K, . . . data of page 1 in file areas in the page memory 323.

Figure 13:
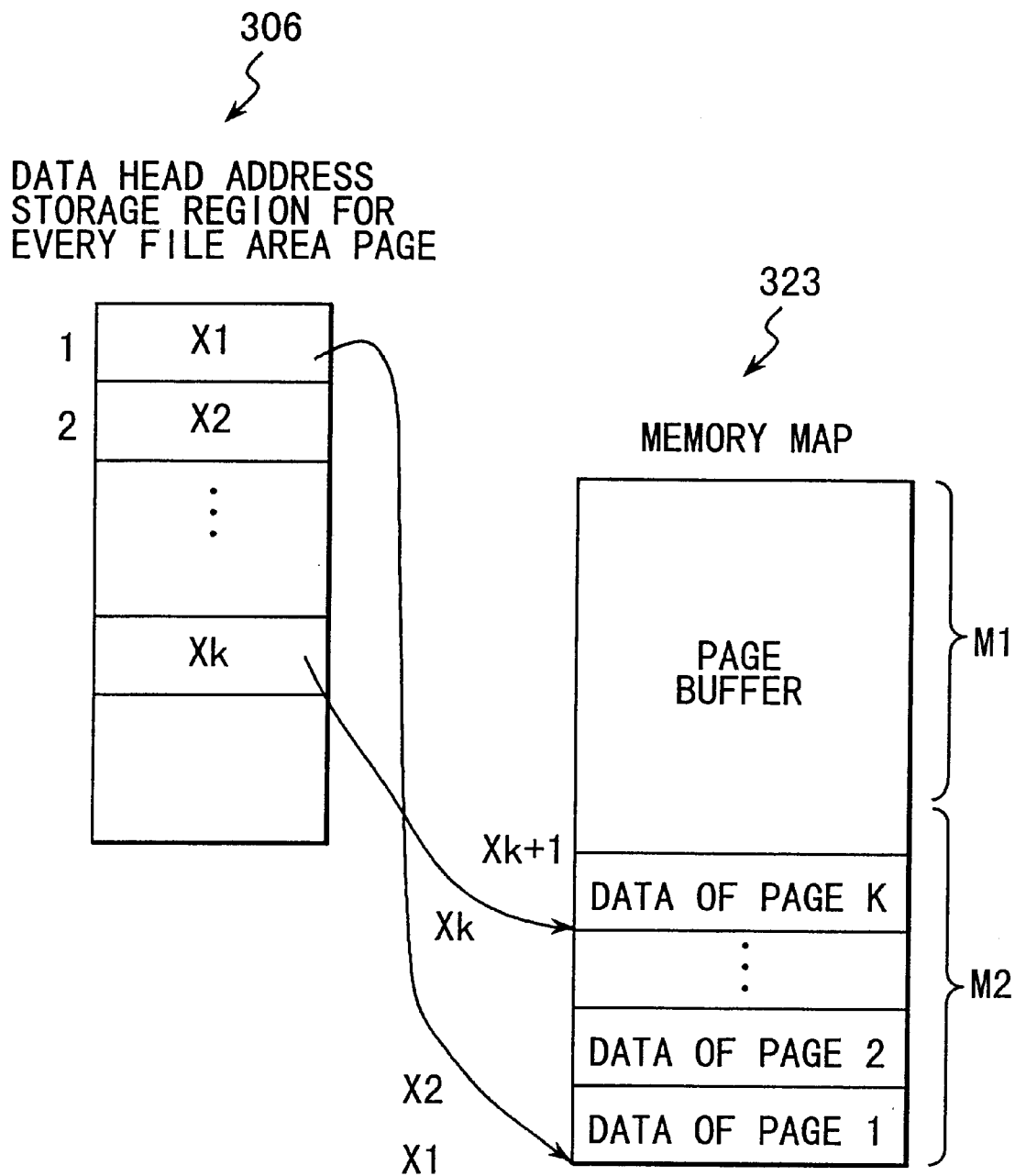
FIG. 13 is a view showing the structure of storage regions stored in a page memory.

As shown in FIG. 13, page management in the electronic sort is carried out by making the head addresses of storage regions on the page memory 323 correspond to the page numbers, respectively. The order of images to be outputted in the print processing can be changed by changing all the address of image storage regions from the first page to the last page.

Figure 19:
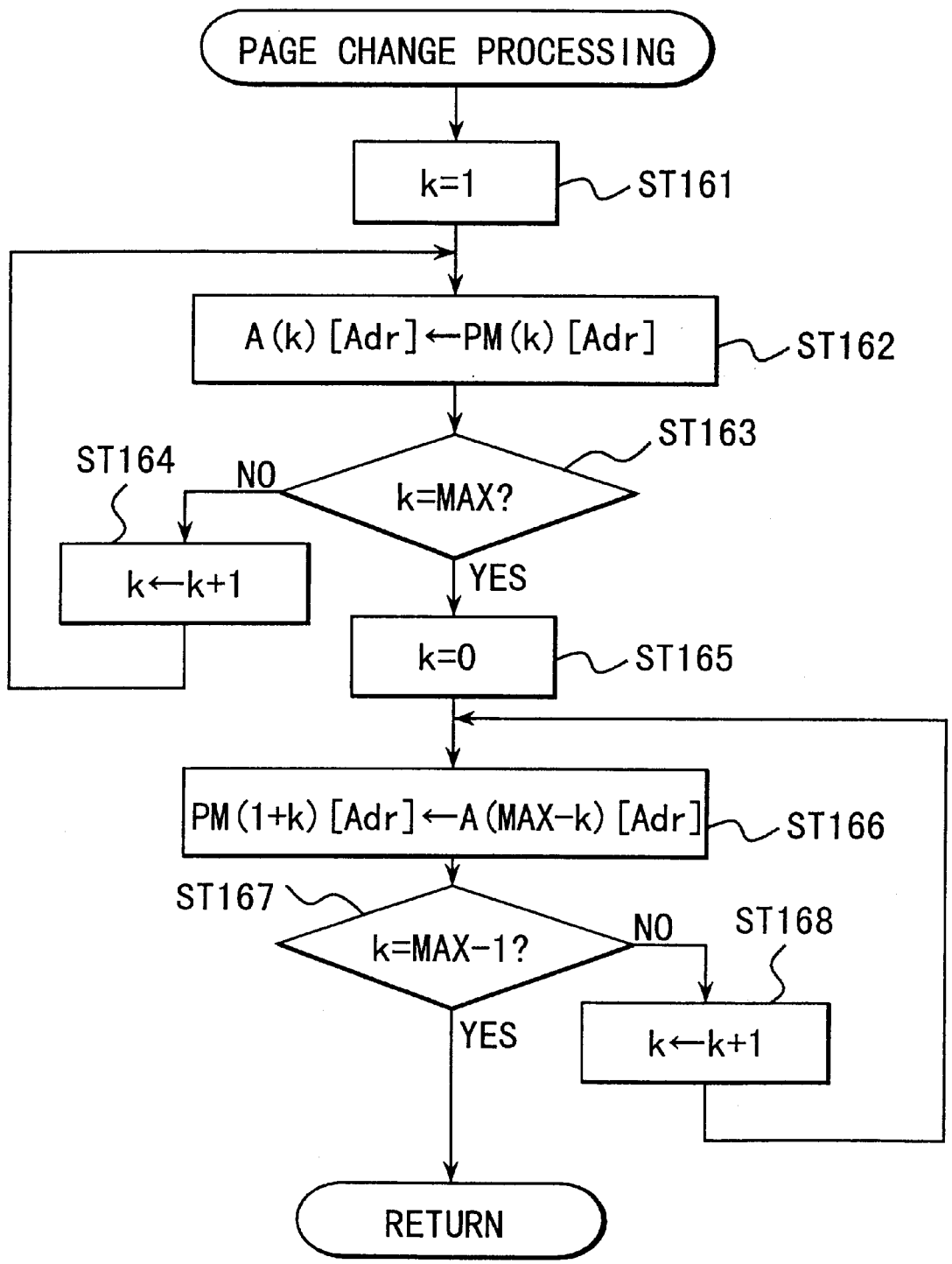
FIG. 19 is a flow-chart for explaining page change processing.

In the next, the page change processing in step ST143 will be explained with reference to the flow-chart shown in FIG. 19.

PM(k) denotes a k-th page memory number. A(k) denotes an exchange array. PM(k)[Adr] denotes an image address stored at the k-th page memory number. A(k)[Adr] denotes an image address stored at k-th in the order to be replaced with.

At first, image addresses stored at page memory numbers are copied into the exchange array. Further, image storage addresses are picked up from the exchange array in the descending order and are stored at the page memory numbers in the ascending order, so that images corresponding to the page numbers are changed.

Note that the page change processing for electronic sort as described above cannot be achieved in the followings cases.

1. In case of electronic sort successive type is carried out in which inputting and printing of original documents are proceeded in parallel.

2. In case of insufficient memory capacity for storing images while inputting original documents.

In case of in the electronic sort successive type operation as described above, printing of the first set of inputted original documents are carried out immediately. Copies printed and fed out are stacked in the same order as the copies are fed out. Therefore, in case where copies are fed out in a face-up state (with their image forming surfaces faced up) like in a digital copy machine, copies are with the first page layered in the lowest position if copies are fed out in the order from the first page. In order to avoid this, the completion type operation should be taken if input in the order from the first page has been specified as in FIG. 11.

Otherwise, in case where copies can be fed out in a face-down state (with their image forming surfaces faced down) like in a laser printer, original documents may be inputted in the order from the first page by feeding out copies in a face-down state, even in operation of successive type. In the present embodiment, the face-down state is achieved by a pair of rollers 74b in the unit 74.

Figure 17:
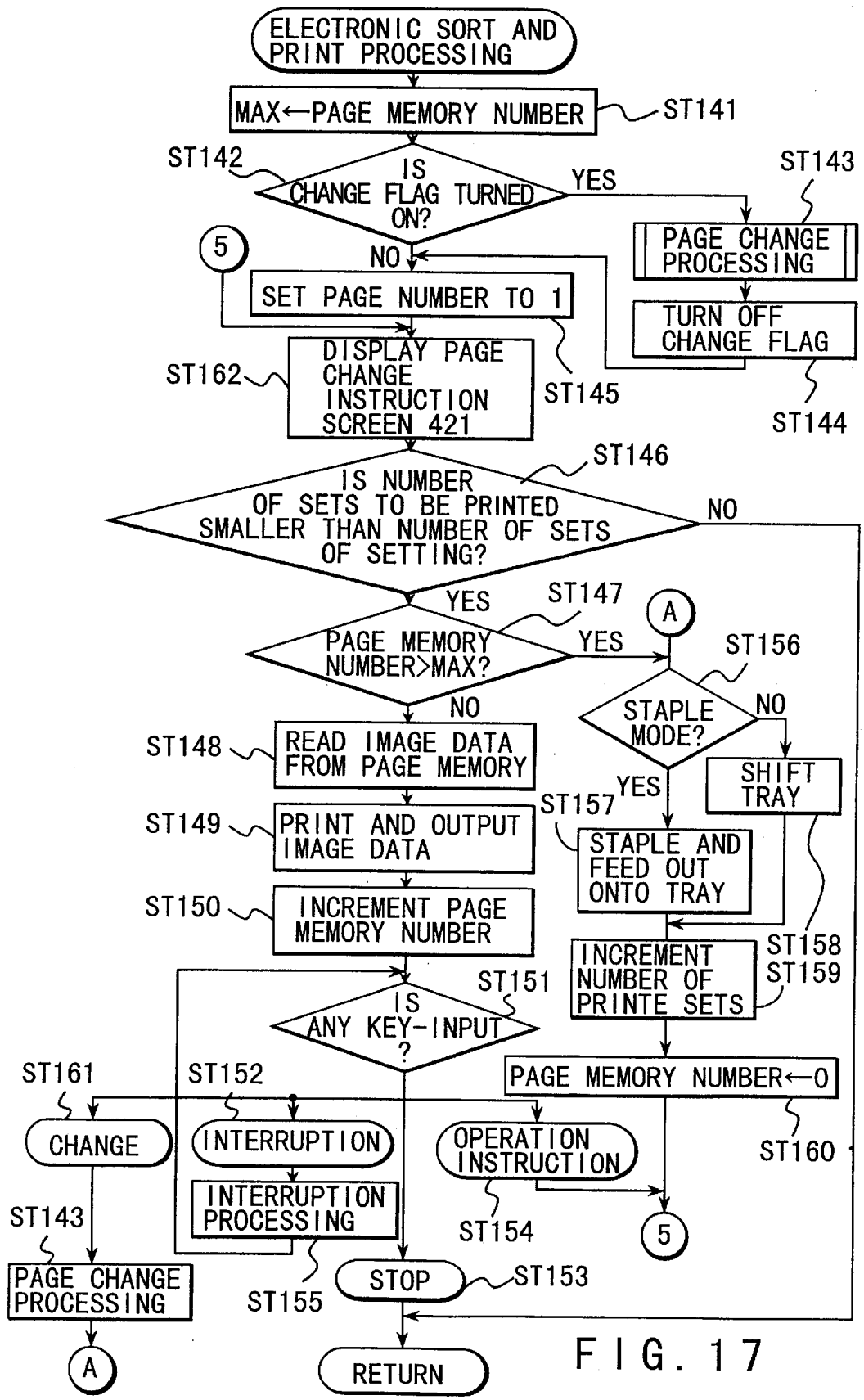
FIG. 17 is a flow-chart for explaining print processing of the electronic sort.

FIG. 20 shows electronic sort processing for feeding out copies in the face-down state. If face-down feeding-out is possible, whether the completion type or the successive type is selected is not identified by checking the change flag as shown in FIG. 11. In case of the completion type, originally, printing is started after all the original documents are read in and it is therefore necessary to determine only whether or not original documents have been inputted in the order from the first page by checking ON/OFF of the change flag immediately before starting print processing, like in the processing shown in FIG. 17.

Figure 21:
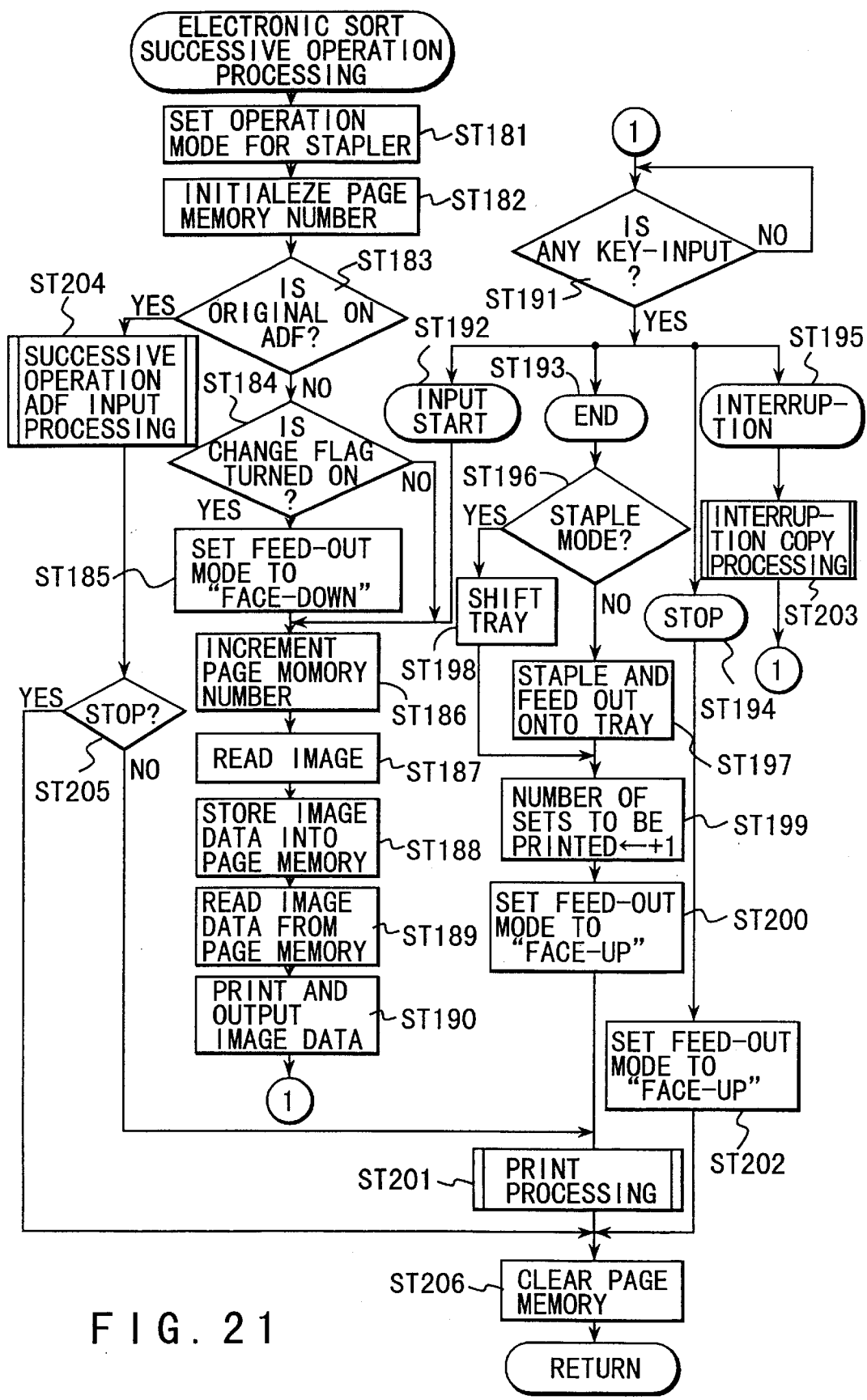
FIG. 21 is a flow-chart for explaining electronic sort successive operation processing of face-down feed-out.
Figure 22:
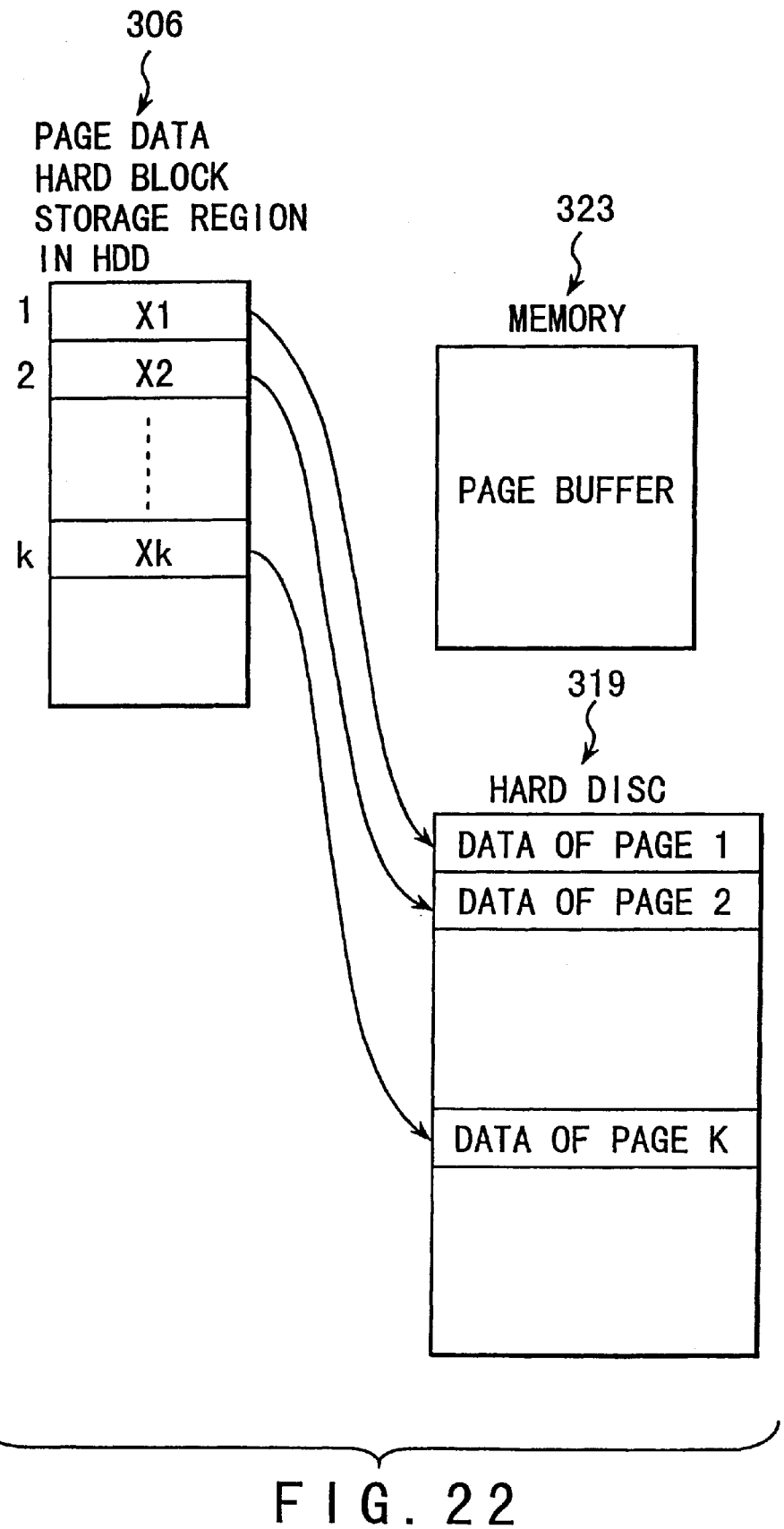
FIG. 22 is a view showing the structure of storage regions stored in a page memory and a hard disk.

FIG. 21 shows electronic sort successive operation processing in case of face-down feeding-out. In case of inputting original documents by the automatic feed device 4, the processing is the same as those shown in FIGS. 15 and 16 even if face-down feeding-out is possible. However, in case where it is determined that there is no originals in the automatic original document feed device 4 and inputting of original documents have been started manually, the feed-out mode of the finisher is set in the face-down feed-out state to prevent a wrong fist page from being taken even when copies are printed and fed out in the order from the first page in the successive type, as long as input in the order from the first page has been specified. Although the first set is fed out in the face-down state in the successive type operation, the same print processing is taken for the second and more sets, and therefore, the feed-out mode is set in the face-up state immediately before print processing.

Next, the case of insufficient memory capacity will be explained.

When the memory capacity runs short while inputting original documents, images remaining in the memory must once be printed and outputted so that the memory is cleared, in order to continue inputting the remaining original documents.

An image in size of A4 with a resolution of 400 dpi requires about 2 MB. If this image is compressed to 25%, data requires 500 kB per A4 size image. To store one hundred images in A4 size on this condition, the memory requires a capacity of 50 MB. In this case, for example, a machine equipped with a 64 MB memory capacity does not run short of memory capacity, but a machine equipped with a 32 MB memory capacity runs short of memory capacity.

As a method of solving the problem insufficient memory capacity, the present embodiment adopts a method of storing compressed image data into a hard disk (HDD) in place of a page memory 323.

When image data is stored into the hard disk 319, the page memory 323 is used only for a page buffer, and the image data is stored into the hard disk 319. Management regions of page images store those head blocks on the hard disk 319 where pages are stored. Note that explanation of data transmission between the page memory 323 and the hard disk 319 will be omitted herefrom.

In the next, page change processing after starting printing will be explained below.

Figure 23:
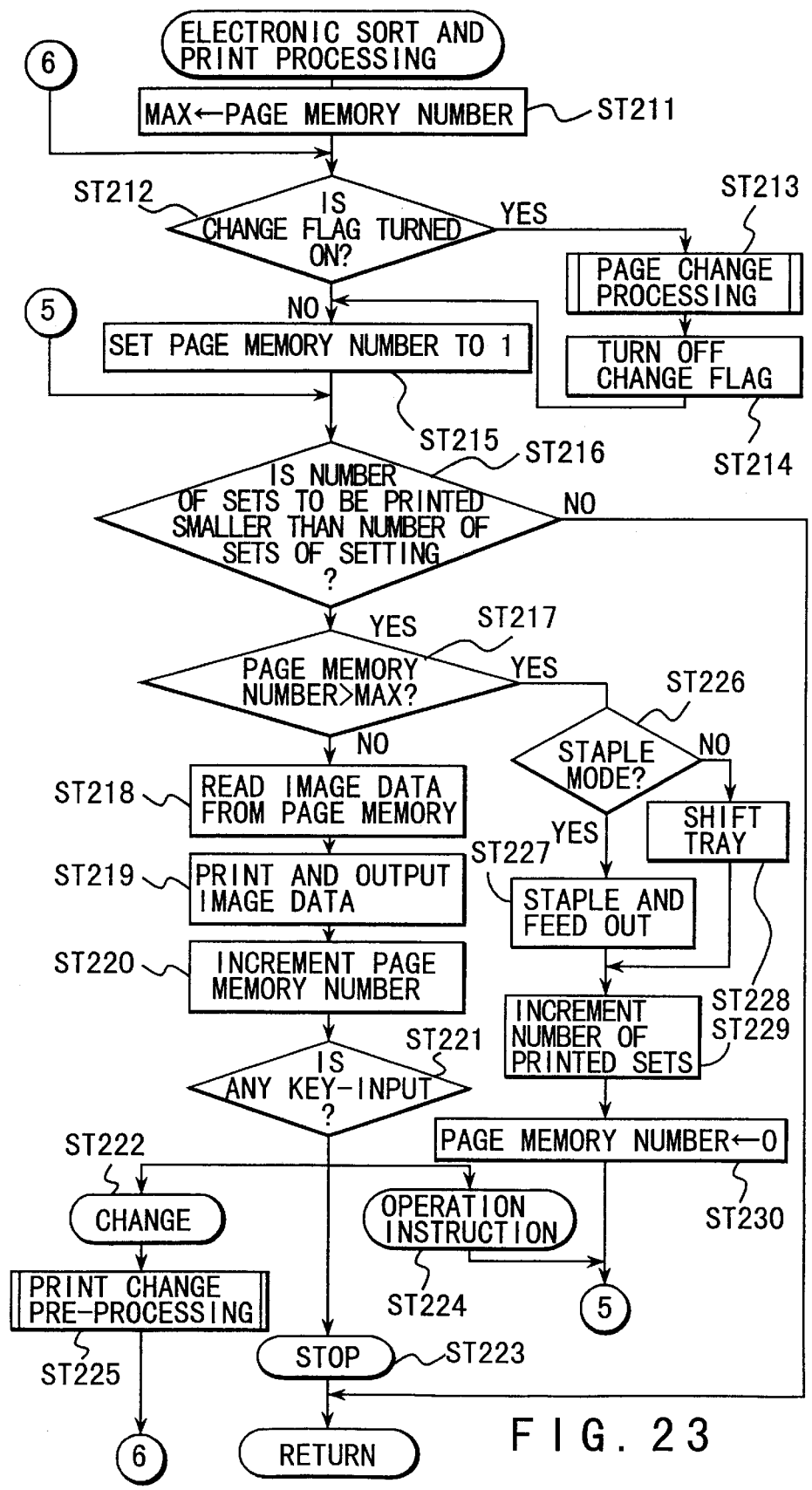
FIG. 23 is a flow-chart for explaining processing capable of changing pages after starting printing.

In the electronic sort print processing described above, it is impossible to change pages if an operator finds after starting printing that original documents have been inputted in the order from the first page. Particularly, in many cases of the completion type, an operator finds it after images are printed. In this respect, FIG. 23 shows processing in which page change is possible even after printing is started.

Specifically, key inputs are arranged so as to accept an order change instruction (ST222). If change is instructed, the processing returns to the top of the print processing after print change pre-processing (ST225), and the processing returns to the top of print processing to start again printing from the beginning.

Figure 24:
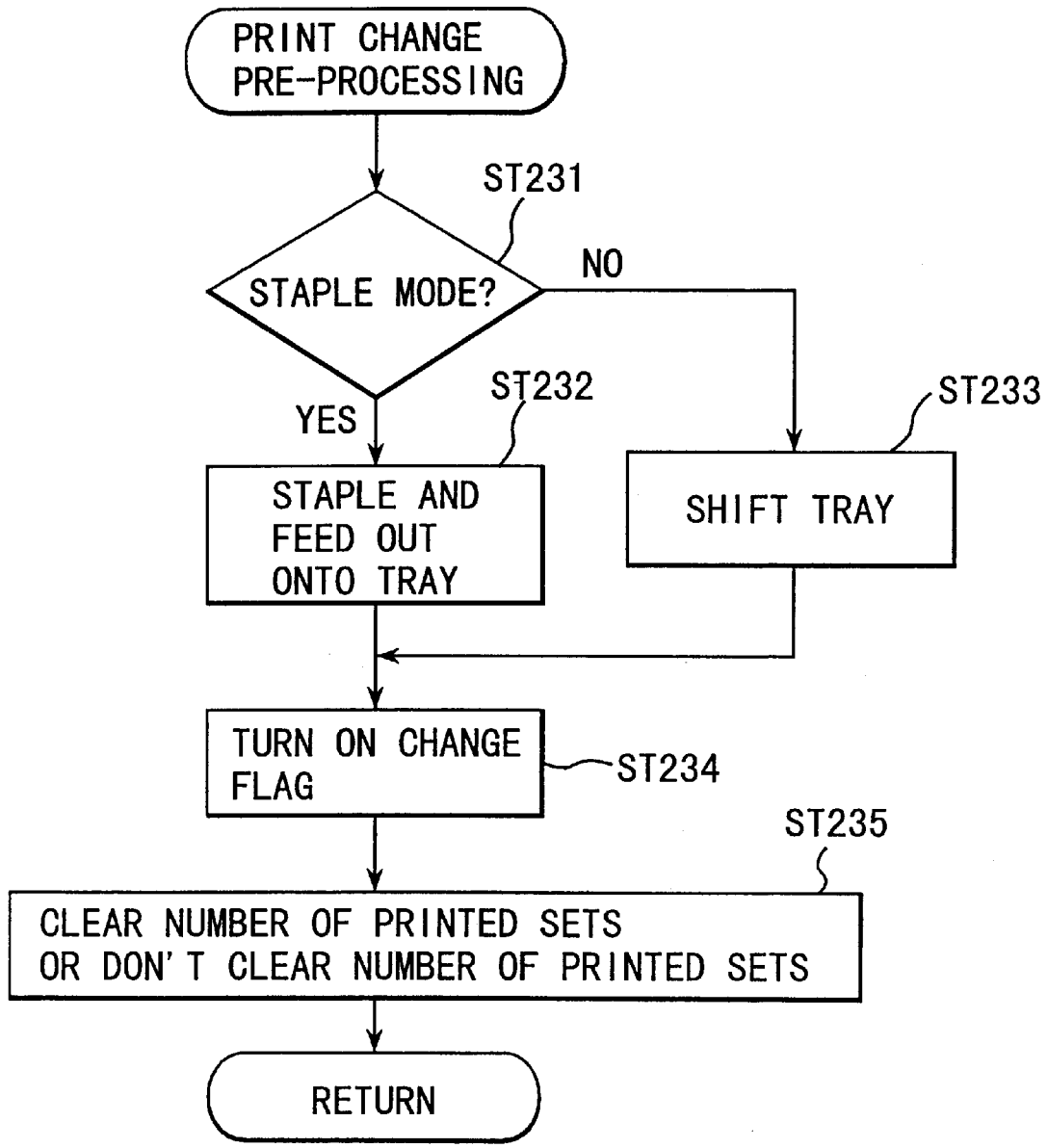
FIG. 24 is a flow-chart for explaining pre-processing for changing the order of pages to be printed.

The print change pre-processing is shown in FIG. 24. At first, in order to separate paper sheets being fed out from paper sheets to be newly fed out, paper sheets are stapled and fed out onto the feed-out tray 74*a* with use of the stapler 74*c* of the unit 74 (ST232), or tray shift is carried out to shift the feed-out tray 74*a* of the unit 74 (ST233). Subsequently, the change flag for changing pages is turned on (ST234) and the count of the number of sets having been printed is cleared or not cleared (ST235). The flow returns to the top of the print processing. If the count of sets having been printed is cleared, paper sheets newly fed out can be easily distinguished from the paper sheets previously having been fed out even when change is instructed during printing, so that printing can be completed without mistaking the number of sets. Otherwise, if the count of sets having been printed is not cleared, printed sets of paper sheets are not wasted.

As has been explained above, according to the embodiment of the present invention, it is possible to instruct the order of pages even before starting electronic sort, even during inputting original documents, or printing copies. Therefore, original documents can be inputted either in the order from the top page or in the order from the last page, in case of manually setting and inputting original documents.

In addition, even if an operator finds out the order of pages to be wrong while inputting original documents or printing copies, it is possible to instruct and change the order of pages, so that original documents need not be inputted again from the beginning.

As described above, according to the present invention, it is possible to provide an image forming apparatus and an image forming method in which original documents can be inputted either in the order from the top page or in the order from the last page, in the manual setting electronic sort, so that miscopy can be prevented even when original documents happen to be inputted in a wrong order from the top page.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
    means for reading images of a series of original documents in a first order and for outputting a series of image data items;
    means for instructing an output of the series of image data items in a second order, reverse to the first order, while the series of the image data items are being output in the first order;
    means for selecting one of a first method in which a number of the series of the image data items output in the first order are cleared and all of the series of the image data items are output from beginning to end in the second order, and a second method in which the number of the image data items output in the first order are not cleared and the remainder of the image data items are output in the second order, when the instruction is given by the instructing means;
    first output means, which receives, from the reading means, the series of the image data items corresponding to the method selected by the selecting means, and forms an image on recording media on the basis of the received image data items, for outputting the recording media on which the image was formed in the first order, to a first tray; and second output means, which receives, from the reading means, the series of the image data items corresponding to the method selected by the selecting means, and forms an image on recording media on the basis of the received image data items, for shifting an output destination of recording media output in the second order, to a second tray which is different from the first tray, and outputting the recording media on which the image was formed in the second order, to the second tray.

2. An image forming apparatus according to claim 1, further comprising:

means for automatically feeding the series of original documents set, one after another, to the reading means; and means for making an input to change the output while the reading means is automatically reading the images of the series of original documents by means of the feeding means.

3. An image forming apparatus according to claim 1, wherein the instructing means includes means for making an input to change the output order while the image forming means is forming the images, and means for stopping image formation even while the images of the series of the image data items are being formed, in accordance with the output order changed by the instructing means, and for reversing the output order of all the series of image data items, to form images again from beginning.

4. An image forming apparatus according to claim 1, wherein the instructing means includes means for making an input to change the output order by means of a touch panel in a liquid crystal screen while the reading means is reading the images of the original documents, and means for making an input to change the output order by means of a touch panel in a liquid crystal screen while the image forming means is forming the images.

5. An image forming apparatus according to claim 1, further comprising:

means for automatically feeding the series of original documents set, one after another, to the reading means; and means for making an input to change the output order by means of a touch panel in a liquid crystal screen while the reading means is automatically reading the images of the series of original documents by means of the feeding means.

6. An image forming apparatus according to claim 1, wherein the instructing means includes means for making an input to change the output order by a touch panel in a liquid crystal screen while the image forming means is forming the images, and means for stopping image formation even while the images of the series of the image data items are being formed, in accordance with the output order changed by the instructing means, and for reversing the output order of all the series of image data items, to form images again from beginning.

7. An image forming apparatus according to claim 1, further comprising:

means for setting an electronic sort mode in accordance with given specifications;

electronic sort mode image forming means for forming images corresponding to the series of image data items in accordance with the electronic sort mode set by the setting means;

second instructing means for instructing the second order reverse to the first order, as the output order of the series of image data items, while the electronic sort mode image forming means is forming images; and means for changing the order of the series of image data items into the second order and for forming images corresponding to the series of image data items converted according to the output order by the second instructing means.

8. An image forming apparatus according to claim 1, further comprising:

means for setting an electronic sort mode in accordance with given specifications;

electronic sort mode image forming means for forming images corresponding to the series of image data items in accordance with the electronic sort mode set by the setting means;

second instructing means for instructing the second order reverse to the first order, as the output order of the series of image data items, while the electronic sort mode image forming means is forming images; and means for stopping image formation even while the images of the series of the image data items are being formed, in accordance with the output order changed by the instructing means, and for reversing the output order of all the series of image data items, to form images corresponding to the series of image data items in the second order again from beginning.

9. An image forming method comprising the steps of:

reading images of a series of original documents in a first order and for outputting a series of image data items;

instructing an output of the series of image data items in a second order, reverse to the first order, while the series of the image data items are being output in the first order;

selecting one of a first method in which a number of the series of the image data items output in the first order are cleared and all of the series of the image data items are output from beginning to end in the second order, and a second method in which the number of the image data items output in the first order are not cleared and the remainder of the image data items are output in the second order, when the instruction is given by the instructing step;

a first outputting step, which receives, from the reading step, the series of the image data items corresponding to the method selected by the selecting step, and forms an image on recording media on the basis of the image data items, for outputting the recording media on which the image was formed in the first order, to a first tray; and a second outputting step, which receives, from the reading step, the series of the image data items corresponding to the method selected by the selecting step, and forms an image on recording media on the basis of the image data items, for shifting an output destination of recording media output in the second order, to a second tray which is different from the first tray, and outputting the recording media on which the image was formed in the second order, to the second tray.

10. An image forming method according to claim 9, further comprising:

automatically feeding the series of original documents set, one after another, to the reading step; and making an input to change the output order while the images of the series of original documents are automatically read in the reading step, by means of the feeding step.

11. An image forming method according to claim 9, wherein the instructing step includes making an input to change the output order while the images are formed in the image forming step, and stopping image formation even while the images of the series of the image data items are being formed, in accordance with the output order changed in the instructing step, and for reversing the output order of all the series of image data items, to form images again from beginning.

12. An image forming method according to claim 9, wherein the instructing step includes making an input to change the output order by activation of a touch panel in a liquid crystal screen while the images of the original documents are being read in the reading step, and making an input to change the output order by activation of the touch panel in the liquid crystal screen while the images are being formed in the image forming step.

13. An image forming method according to claim 9, further comprising:
  automatically feeding the series of original documents set, one after another, to the reading step; and
  making an input to change the output order by activation of a touch panel in a liquid crystal screen while the images of the series of original documents are being automatically read in the reading step by way of the feeding step.

14. An image forming method according to claim 9, wherein the instructing step includes making an input to change the output order by a touch panel in a liquid crystal screen while the images are being formed in the image forming step, and stopping image formation even while the images of the series of the image data items are being formed, in accordance with the output order changed in the instructing step, and reversing the output order of all the series of image data items, to form images again from beginning.

15. An image forming method according to claim 9, further comprising:
  setting an electronic sort mode in accordance with given specifications;
  forming images corresponding to the series of image data items in accordance with the electronic sort mode set in the setting step;
  instructing the second order reverse to the first order, as the output order of the series of image data items, while images are being formed in the electronic sort mode image forming step; and
  changing the order of the series of image data items into the second order and forming images corresponding to the series of image data items converted according to the output order by the previous instructing step.

16. An image forming method according to claim 9, further comprising:
  setting an electronic sort mode in accordance with given specifications;
  forming images corresponding to the series of image data items in accordance with the electronic sort mode set in the setting step;
  instructing the second order reverse to the first order, as the output order of the series of image data items, while images are being formed in the electronic sort mode image forming step; and
  stopping image formation even while the images of the series of the image data items are being formed, in accordance with the output order changed in the instructing step, and reversing the output order of all the series of image data items, to form images corresponding to the series of image data items in the second order again from beginning.

17. An image forming apparatus comprising:
  means for reading images of a series of original documents in a first order and for outputting a series of image data items;
  storage means for storing the series of image data items outputted from the reading means;
  means for instructing an output of the series of image data item in a second order reverse to the first order, while the series of the image data items are being output in the first order;
  means for selecting one of a first method in which a number of the series of the image outputted in the first order are cleared and all of the series of the image are output from beginning to end in the second order, and a second method in which the number of image data items outputted in the first order are not cleared and the remainder of the image data items are outputted in the second order, when the instruction is given by the instructing means;
  first output means, which receives, from the reading means, the series of the image data items corresponding to the method selected by the selecting means, and forms an image on recording media on the basis of the received image data items, and outputs the recording media on which the image was formed in the first order, to a first tray; and
  second output means, which receives, from the reading means, the series of the image data items corresponding to the method selected by the selecting means, and forms an image on recording media on the basis of the received image data items, for shifting an output destination of recording media output in the second order, to a second tray which is different from the first tray, and outputting the recording media on which the image was formed in the second order, to the second tray.

18. An image forming apparatus comprising:
  means for reading images of a first series of original documents in a first order and for outputting a series of image data items at a reading position;
  means for automatically feeding a second series of original documents set, one after another, to the reading position;
  first controlling means for controlling such that the reading means reads the second series of original documents fed by the feeding means as the first series of original documents;
  second controlling means for, when a third series of original documents are manually set one by one on the reading position, controlling such that the reading means reads the third series of original documents as the first series of original documents;
  storage means for storing the series of image data items output from the reading means;
  first output means, which receives, from the reading means, the series of the image data items and forms an image on recording media on the basis of the received image data items, for outputting the recording media on which the image was formed in the first order, to a first tray;
  means for instructing an output of the series of image data item in a second order, reverse to the first order, while the series of the image data items are being output in the first order;

means for selecting one of a first method in which a number of the series of the image outputted in the first order are cleared and all of the series of the images are output from beginning to end in the second order, and a second method in which the number of the images output in the first order are not cleared and the remainder of the output images are output in the second order, when the instruction is given by the instructing means; and second output means, which receives, from the reading means, the series of the image data items corresponding to the method selected by the selecting means, and forms an image on recording media on the basis of the received image data items, for shifting an output destination of recording media output in the second order, to a second tray which is different from the first tray, and outputting the recording media on which the image was formed in the second order, to the second tray.

* * * * *